(12) United States Patent
Hodzic et al.

(10) Patent No.: US 8,745,675 B2
(45) Date of Patent: *Jun. 3, 2014

(54) MULTIPLE AUDIO STREAMS

(75) Inventors: Edin Hodzic, Pleasanton, CA (US); Prasanna Ganesan, Menlo Park, CA (US); Andrew M. Goodman, Portola Valley, CA (US); Sumankar Shankar, Alwarpet (IN)

(73) Assignee: Vudu, Inc., Santa Clara, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 12/896,701

(22) Filed: Oct. 1, 2010

(65) Prior Publication Data

US 2011/0023072 A1 Jan. 27, 2011

Related U.S. Application Data

(63) Continuation of application No. 11/492,673, filed on Jul. 24, 2006, and a continuation-in-part of application No. 11/388,613, filed on Mar. 23, 2006, now Pat. No. 8,018,995, and a continuation-in-part of application No. 11/331,113, filed on Jan. 10, 2006, now abandoned, and a continuation-in-part of application No. 11/075,573, filed on Mar. 9, 2005, now Pat. No. 8,219,635.

(51) Int. Cl.
*H04N 7/173* (2011.01)

(52) U.S. Cl.
USPC ............... 725/86; 725/87; 725/88; 725/89; 725/90; 725/91; 725/92; 725/93; 725/94; 725/95; 725/96; 725/97; 725/98; 725/99; 725/100; 725/101; 725/102; 725/103; 725/104; 725/115; 725/116; 725/133; 725/134; 725/141; 725/142; 725/145; 725/146; 725/153

(58) Field of Classification Search
USPC ........... 725/13–134, 141–142, 145–146, 153; 709/231
See application file for complete search history.

(56) References Cited

U.S. PATENT DOCUMENTS

| 5,132,992 A | 7/1992 | Yurt et al. |
| 5,414,455 A | 5/1995 | Hooper et al. |

(Continued)

FOREIGN PATENT DOCUMENTS

| WO | WO 97/16023 | 5/1997 |
| WO | WO 01/24526 | 4/2001 |
| WO | WO 03/041383 | 5/2003 |

OTHER PUBLICATIONS

Communication of Dec. 16, 2010 in European Application No. 08796939.0-1244.

(Continued)

*Primary Examiner* — Yassin Alata
(74) *Attorney, Agent, or Firm* — David R. Stevens; Stevens Law Group

(57) ABSTRACT

A system and method for providing multiple audio streams for a video over a network such as the Internet. The system comprises a server that includes an encryption unit and a slicing unit, a plurality of boxes, and an ordering box. The server encodes multiple audio streams and a single video to be sliced into segments. The sliced segments of multiple audio streams and the single video are seeded to a number of the plurality of boxes. This may be repeated for other videos with multiple streams. When the ordering box makes a request for a single video with a single audio, then the number of boxes with segments of the requested video and multiple audio streams, filters and sends the requested video and requested single audio stream to the ordering box. Similarly, multiple closed caption streams can be handled and provided like the audio streams.

17 Claims, 12 Drawing Sheets

(56) References Cited

U.S. PATENT DOCUMENTS

| | | | |
|---|---|---|---|
| 5,530,754 A | 6/1996 | Garfinkle | |
| 5,602,918 A | 2/1997 | Chen et al. | |
| RE35,651 E | 11/1997 | Bradley et al. | |
| 5,694,559 A | 12/1997 | Hobson et al. | |
| 5,701,582 A | 12/1997 | DeBey | |
| 5,721,878 A | 2/1998 | Ottesen et al. | |
| 5,729,280 A | 3/1998 | Inoue et al. | |
| 5,761,417 A | 6/1998 | Henley et al. | |
| 5,765,164 A | 6/1998 | Prasad et al. | |
| 5,798,785 A | 8/1998 | Hendricks et al. | |
| 5,802,283 A | 9/1998 | Grady et al. | |
| 5,812,123 A | 9/1998 | Rowe et al. | |
| 5,815,146 A | 9/1998 | Youden et al. | |
| 5,815,662 A | 9/1998 | Ong | |
| 5,826,168 A | 10/1998 | Inoue et al. | |
| 5,831,662 A | 11/1998 | Payton | |
| 5,838,314 A | 11/1998 | Neel et al. | |
| 5,877,812 A | 3/1999 | Krause et al. | |
| 5,884,031 A | 3/1999 | Ice | |
| 5,886,730 A | 3/1999 | Tsosie | |
| 5,903,563 A | 5/1999 | Rashid et al. | |
| 5,926,205 A | 7/1999 | Krause et al. | |
| 5,928,331 A | 7/1999 | Bushmitch | |
| 5,933,603 A | 8/1999 | Vahalia et al. | |
| 5,948,070 A | 9/1999 | Fujita | |
| 6,005,565 A | 12/1999 | Legall et al. | |
| 6,014,694 A * | 1/2000 | Aharoni et al. | 709/219 |
| 6,018,359 A | 1/2000 | Kermode et al. | |
| 6,037,983 A | 3/2000 | Au et al. | |
| 6,038,560 A | 3/2000 | Wical | |
| 6,055,314 A | 4/2000 | Spies et al. | |
| 6,124,854 A | 9/2000 | Sartain et al. | |
| 6,138,221 A | 10/2000 | Korst et al. | |
| 6,170,006 B1 | 1/2001 | Namba | |
| 6,177,931 B1 | 1/2001 | Alexander et al. | |
| 6,184,878 B1 | 2/2001 | Alonso et al. | |
| 6,212,549 B1 | 4/2001 | Page et al. | |
| 6,236,504 B1 | 5/2001 | Kao et al. | |
| 6,263,504 B1 | 7/2001 | Ebisawa | |
| 6,285,987 B1 | 9/2001 | Roth et al. | |
| 6,324,519 B1 | 11/2001 | Eldering | |
| 6,334,124 B1 | 12/2001 | Bouchard et al. | |
| 6,397,251 B1 | 5/2002 | Graf | |
| 6,463,508 B1 | 10/2002 | Wolf et al. | |
| 6,502,139 B1 | 12/2002 | Birk et al. | |
| 6,515,680 B1 | 2/2003 | Hendricks et al. | |
| 6,519,693 B1 | 2/2003 | Debey | |
| 6,614,366 B2 | 9/2003 | Luby | |
| 6,622,305 B1 | 9/2003 | Willard | |
| 6,630,963 B1 | 10/2003 | Billmaier | |
| 6,640,241 B1 | 10/2003 | Ozzie et al. | |
| 6,701,528 B1 | 3/2004 | Arsenault et al. | |
| 6,704,813 B2 | 3/2004 | Smirnov et al. | |
| 6,728,763 B1 | 4/2004 | Chen | |
| 6,731,605 B1 | 5/2004 | Deshpande | |
| 6,763,392 B1 | 7/2004 | del Val et al. | |
| 6,789,106 B2 | 9/2004 | Eyer et al. | |
| 6,801,947 B1 | 10/2004 | Li | |
| 6,804,719 B1 | 10/2004 | Cabrera | |
| 6,857,012 B2 | 2/2005 | Sim et al. | |
| 6,934,965 B2 | 8/2005 | Gordon et al. | |
| 6,938,258 B1 | 8/2005 | Weinberger et al. | |
| 6,944,585 B1 | 9/2005 | Pawson | |
| 6,970,937 B1 | 11/2005 | Huntington | |
| 6,973,667 B2 | 12/2005 | Fritsch | |
| 7,024,679 B1 | 4/2006 | Sie et al. | |
| 7,051,360 B1 | 5/2006 | Ellis et al. | |
| 7,080,400 B1 | 7/2006 | Navar | |
| 7,110,006 B2 | 9/2006 | MacInnis et al. | |
| 7,174,385 B2 | 2/2007 | Li | |
| 7,188,357 B1 | 3/2007 | Rieschl et al. | |
| 7,191,215 B2 | 3/2007 | Ganesan et al. | |
| 7,228,556 B2 | 6/2007 | Beach et al. | |
| 7,240,359 B1 | 7/2007 | Sie et al. | |
| 7,246,369 B1 | 7/2007 | Duan et al. | |
| 7,260,829 B1 | 8/2007 | Hendricks et al. | |
| 7,281,261 B2 | 10/2007 | Jaff et al. | |
| 7,293,275 B1 | 11/2007 | Krieger et al. | |
| 7,324,555 B1 | 1/2008 | Chen et al. | |
| 7,360,235 B2 | 4/2008 | Davies et al. | |
| 7,379,963 B1 | 5/2008 | Khare et al. | |
| 7,386,874 B2 | 6/2008 | White et al. | |
| 7,577,750 B2 | 8/2009 | Shen et al. | |
| 7,633,887 B2 | 12/2009 | Panwar et al. | |
| 7,698,451 B2 | 4/2010 | Ganesan | |
| 7,810,647 B2 | 10/2010 | Ganesan et al. | |
| 2001/0019630 A1 | 9/2001 | Johnson | |
| 2001/0024239 A1 | 9/2001 | Feder et al. | |
| 2001/0042249 A1 | 11/2001 | Knepper et al. | |
| 2001/0051998 A1 | 12/2001 | Henderson | |
| 2002/0022956 A1 | 2/2002 | Ukrainczyk | |
| 2002/0029282 A1 | 3/2002 | Buddhikot et al. | |
| 2002/0031331 A1 | 3/2002 | Kwoh et al. | |
| 2002/0053078 A1 | 5/2002 | Holtz et al. | |
| 2002/0083147 A1 * | 6/2002 | Ripperger | 709/213 |
| 2002/0091825 A1 | 7/2002 | Shuster | |
| 2002/0129375 A1 | 9/2002 | Kim et al. | |
| 2002/0131423 A1 | 9/2002 | Chan et al. | |
| 2002/0133491 A1 * | 9/2002 | Sim et al. | 707/10 |
| 2002/0143959 A1 | 10/2002 | El-Baze et al. | |
| 2002/0154892 A1 | 10/2002 | Hoshen et al. | |
| 2002/0162109 A1 | 10/2002 | Shteyn | |
| 2002/0163882 A1 | 11/2002 | Bornstein et al. | |
| 2003/0026254 A1 | 2/2003 | Sim | |
| 2003/0028490 A1 | 2/2003 | Miura et al. | |
| 2003/0040962 A1 | 2/2003 | Lewis | |
| 2003/0046698 A1 | 3/2003 | Kamen et al. | |
| 2003/0055893 A1 | 3/2003 | Sato et al. | |
| 2003/0078964 A1 | 4/2003 | Parrella et al. | |
| 2003/0084461 A1 | 5/2003 | Hoang | |
| 2003/0097661 A1 | 5/2003 | Li et al. | |
| 2003/0115597 A1 | 6/2003 | Yassin et al. | |
| 2003/0126277 A1 | 7/2003 | Son et al. | |
| 2003/0135867 A1 | 7/2003 | Guedalia | |
| 2003/0163646 A1 | 8/2003 | O'Neil | |
| 2003/0188316 A1 | 10/2003 | DePrez | |
| 2003/0188317 A1 | 10/2003 | Liew et al. | |
| 2003/0204613 A1 | 10/2003 | Hudson et al. | |
| 2003/0204856 A1 | 10/2003 | Buxton | |
| 2003/0208612 A1 | 11/2003 | Harris et al. | |
| 2004/0016000 A1 | 1/2004 | Zhang et al. | |
| 2004/0078460 A1 | 4/2004 | Valavi et al. | |
| 2004/0107242 A1 | 6/2004 | Vert et al. | |
| 2004/0117831 A1 | 6/2004 | Ellis et al. | |
| 2004/0122741 A1 | 6/2004 | Sidman | |
| 2004/0123324 A1 | 6/2004 | Sazzad et al. | |
| 2004/0128343 A1 | 7/2004 | Mayer | |
| 2004/0133923 A1 | 7/2004 | Watson et al. | |
| 2004/0143672 A1 | 7/2004 | Padmanabham et al. | |
| 2004/0143850 A1 | 7/2004 | Costa | |
| 2004/0148634 A1 | 7/2004 | Arsenault et al. | |
| 2004/0148636 A1 | 7/2004 | Weinstein et al. | |
| 2004/0158867 A1 | 8/2004 | Mack et al. | |
| 2004/0202073 A1 | 10/2004 | Lai et al. | |
| 2004/0216164 A1 | 10/2004 | Hayhurst | |
| 2004/0250286 A1 | 12/2004 | Fraser et al. | |
| 2004/0255323 A1 | 12/2004 | Varadarajan et al. | |
| 2004/0267822 A1 | 12/2004 | Curran et al. | |
| 2005/0005241 A1 | 1/2005 | Hunleth et al. | |
| 2005/0010653 A1 | 1/2005 | McCanne | |
| 2005/0015511 A1 | 1/2005 | Izmailov et al. | |
| 2005/0033856 A1 | 2/2005 | Li | |
| 2005/0038724 A1 | 2/2005 | Roever et al. | |
| 2005/0041679 A1 | 2/2005 | Weinstein et al. | |
| 2005/0055425 A1 | 3/2005 | Lango et al. | |
| 2005/0055718 A1 | 3/2005 | Stone | |
| 2005/0066063 A1 | 3/2005 | Grigorovitch et al. | |
| 2005/0076363 A1 | 4/2005 | Dukes et al. | |
| 2005/0086696 A1 | 4/2005 | Daniels | |
| 2005/0108414 A1 | 5/2005 | Taylor et al. | |
| 2005/0177853 A1 | 8/2005 | Williams et al. | |
| 2005/0216941 A1 | 9/2005 | Flanagan et al. | |
| 2005/0259682 A1 | 11/2005 | Yosef et al. | |
| 2005/0267948 A1 | 12/2005 | McKinley et al. | |

(56) References Cited

U.S. PATENT DOCUMENTS

| | | |
|---|---|---|
| 2005/0289593 A1 | 12/2005 | Spilo |
| 2006/0008256 A1 | 1/2006 | Khedouri et al. |
| 2006/0026639 A1 | 2/2006 | Potrebic et al. |
| 2006/0026663 A1 | 2/2006 | Kortum et al. |
| 2006/0031537 A1 | 2/2006 | Boutboul et al. |
| 2006/0034537 A1 | 2/2006 | Masaki |
| 2006/0037037 A1 | 2/2006 | Miranz |
| 2006/0075453 A1 | 4/2006 | Choi |
| 2006/0106807 A1 | 5/2006 | DeVitis et al. |
| 2006/0136597 A1 | 6/2006 | Shabtai et al. |
| 2006/0174160 A1 | 8/2006 | Kim |
| 2006/0184688 A1 | 8/2006 | Ganguly et al. |
| 2006/0190615 A1 | 8/2006 | Panwar et al. |
| 2006/0190975 A1 | 8/2006 | Gonzalez |
| 2006/0206889 A1 | 9/2006 | Ganesan et al. |
| 2006/0218088 A1 | 9/2006 | Flora et al. |
| 2006/0218217 A1 | 9/2006 | Ganesan et al. |
| 2006/0242153 A1 | 10/2006 | Newberry et al. |
| 2006/0248078 A1 | 11/2006 | Gross et al. |
| 2007/0089146 A1 | 4/2007 | Ikeda et al. |
| 2007/0143804 A1 | 6/2007 | Wang |
| 2008/0022343 A1 | 1/2008 | Hodzic et al. |
| 2008/0091840 A1 | 4/2008 | Guo et al. |
| 2008/0134258 A1 | 6/2008 | Goose et al. |
| 2008/0148323 A1 | 6/2008 | White et al. |
| 2008/0212945 A1 | 9/2008 | Khedouri et al. |
| 2008/0256272 A1 | 10/2008 | Kampmann et al. |
| 2008/0281913 A1 | 11/2008 | Shankar et al. |
| 2008/0282036 A1 | 11/2008 | Ganesan |
| 2008/0301738 A1 | 12/2008 | Davies et al. |
| 2009/0007196 A1 | 1/2009 | Ganesan |
| 2009/0019174 A1 | 1/2009 | Ehn et al. |
| 2009/0019468 A1 | 1/2009 | Ganesan et al. |
| 2009/0019489 A1 | 1/2009 | Ohlfs et al. |
| 2009/0024573 A1 | 1/2009 | Zink |
| 2009/0025046 A1 | 1/2009 | Ganesan et al. |
| 2009/0025048 A1 | 1/2009 | Ganesan |
| 2010/0049867 A1 | 2/2010 | Panwar et al. |
| 2010/0223362 A1 | 9/2010 | Price |
| 2010/0254675 A1 | 10/2010 | Ganesan |

OTHER PUBLICATIONS

Final Office Action dated Feb. 10, 2011 in U.S. Appl. No. 11/515,267, 12 pages.
Ma et al., "Reducing bandwidth requirement for delivering video over wide area networks with proxy server", IEEE, 2002, vol. 4, Iss. 4, p. 539-550.
Non-Final Office Action dated Apr. 21, 2011 in U.S. Appl. No. 11/278,416.
Non-Final Office Action dated Mar. 14, 2011 in U.S. Appl. No. 11/492,673, 15 pages.
Non-Final Office Action dated Mar. 14, 2011 in U.S. Appl. No. 11/150,653, 34 pages.
Non-Final Office Action dated Feb. 25, 2011 in U.S. Appl. No. 11/075,573, 27 pages.
Ramesh et al., "Multicast with cache (Mcache): an adaptive zero-delay video-on-demand service", IEEE, 2001. vol. 11, Iss. 3; p. 440-456.
U.S. Appl. No. 11/150,653, filed Jun. 11, 2005, Ganesan et al.
U.S. Appl. No. 11/404,972, filed Apr. 13, 2006, Ganesan.
U.S. Appl. No. 11/515,267, filed Sep. 1, 2006, Ganesan.
U.S. Appl. No. 11/927,690, filed Oct. 30, 2007, Ganesan et al.
Video-on-Demand Research, from http://www.cs.ndsu.nodak.edu/-rvetter|ATM/html/video.html, dated Oct. 31, 2005, North Dakota State University, Computer Science Department, 2 pgs., Oct. 31, 2005.
C. Siva Ram Murthy "A Primary-Segmented Backup Scheme for Fast Restoration of Real-Time Channels from Network Component Failures", from http://www.prl.ernet.in/-librarv/Hari%200m/Hari%200m%20Lecture/Siva/%20Ram%20Murthy final.html, dated Oct. 31, 2005, Indian Institute of Technology, Department ofComputer Science and Engineering, 8 pgs, Oct. 31, 2005.
Clifford A. Shaffer, A Practical Introduction to Data Structures and Algorithm Analysis Java Edition, 1998, Alan Apt, Prentice-Hall, Inc., 11 pgs.
Decision on Petition to Make Special dated Nov. 29, 2005 in U.S. Appl. No. 11/075,573, 1 pg.
Decision on Petition to Make Special dated Apr. 16, 2005 in U.S. Appl. No. 11/077,411, 1 pg.
Election/Restriction Requirement dated Oct. 28, 2009 in U.S. Appl. No. 11/404,972, 6 pgs.
Final Office Action dated Dec. 29, 2008 in U.S. Appl. No. 11/210,272, 19 pgs.
Final Office Action dated Dec. 3, 2008 in U.S. Appl. No. 11/458,384, 24 pgs.
Final Office Action dated Mar. 18, 2008 in U.S. Appl. No. 11/075,573, 18 pgs.
Final Office Action dated Apr. 24, 2006 in U.S. Appl. No. 11/077,411, 7 pgs.
Final Office Action dated Oct. 14, 2010 in U.S. Appl. No. 11/076,214, 12 pages.
Final Office Action dated Sep. 17, 2010 in U.S. Appl. No. 11/150,653; 31 pages.
Final Office Action date Aug. 31, 2010 in U.S. Appl. No. 11/831,938; 29 pages.
Final Office Action dated Aug. 14, 2009 in U.S. Appl. No. 11/150,653, 27 pgs.
Final Office Action dated Sep. 30, 2009 in U.S. Appl. No. 11/269,462, 27 pgs.
Final Office Action dated Aug. 31, 2009 in U.S. Appl. No. 11/278,416, 15 pgs.
Final Office Action dated Aug. 31, 2009 in U.S. Appl. No. 11/492,673, 16 pgs.
Final Office Action dated Sep. 28, 2010 in U.S. Appl. No. 11/492,673, 12 pages.
Final Office Action date May 5, 2010 in U.S. Appl. No. 11/269,462, 10 pages.
Final Office Action dated Jan. 21, 2010 in U.S. Appl. No. 11/515,267, 11 pgs.
Final Office Action date Mar. 26, 2010 in U.S. Appl. No. 11/930,147, 13 pages.
Final Office Action date Aug. 4, 2009 in U.S. Appl. No. 11/076,214, 16 pages.
Final Office Action date Jan. 21, 2010 in U.S. Appl. No. 11/075,573,24pages.
Final Office Action Mar. 18, 2010 in U.S. Appl. No. 11/331,113 15pages.
Francois, Alexandre R.J., "A Hybrid Architectural Style for Distributed Parallel Processing of Generic Data Streams" May 2004, IEEE Computer Society, ICSE '04: Proceedings of the 26th International Conference on Software Engineering, pp. 1-10.
Guo, Yang et al., "P2Cast: Peer-to-peer Patching Scheme for VoD Service" May 2003, ACM, WWW '03: Proceedings of the 12th international conference on World Wide Web, pp. 301-309.
International Preliminary Report on Patentability and Written Opinion in the International Application PCT/US2005/020051, World Intellectual Property Organization, European Patent Office, Apr. 3, 2007, 4 pages.
International Preliminary Report on Patentability and Searching Authority in the International Application PCT/US2006/007070, World IntellectualProperty Organization, European Patent Office, Sep. 12, 2007,7 pages, Written Opinion of the International.
International Preliminary Report on Patentability and Written Opinion of the International Searching Authority in International Application PCT/US2008/071735, European Patent Office, Feb. 11, 2010, 7 pages.
International Search Report and Written Opinion of the International Searching Authority inInternational Application PCT/US2006/007070, European Patent Office, Apr. 19, 2007, 9 pages.
International Search Report International Searching Authority inInternational Application PCT/US2005/020051, European Patent Office, Mar. 9, 2007, 3 pages.
International Search Report and Written Opinion of the International Searching Authority inInternational Application PCT/US2006/007070, European Patent Office, Feb. 27, 2006, 12 pages.

(56) References Cited

OTHER PUBLICATIONS

Jim Ferrara, "Creating and Maintaining a Hierarchical Directory", from http://devzone.zend.com/article/1259-Creating-and%20Maintaining-a-Hierarchical-Directory, dated Jan. 15, 2008, Zend Developer Zone, Nov. 2002, 14 pgs.

Lisa Payne, "Web Authoring Inline Images", from http://www.coventry.ac.uk/swift/~csx067/web_auth/images.htm, dated Apr. 16, 2008, Coventry University, Jan. 2002, 4 pgs.

Non-Final Office Action dated Dec. 26, 2008 in U.S. Appl. No. 11/150,653, 26 pgs.

Non-Final Office Action dated Aug. 28, 2006 in U.S. Appl. No. 11/077,411, 10 pgs.

Non-Final Office Action date Mar. 24, 2010 in U.S. Appl. No. 11/404,972, 10 pages.

Non-Final Office Action dated Mar. 11, 2009 in U.S. Appl. No. 11/492,673, 12 pgs.

Non-Final Office Action dated Jan. 30, 2006 in U.S. Appl. No. 11/077,411, 6 pgs.

Non-Final Office Action dated Oct. 17, 2007 in U.S. Appl. No. 11/075,573, 13 pgs.

Non-Final Office Action dated Oct. 28, 2008 in U.S. Appl. No. 10/867,155, 12 pgs.

Non-Final Office Action date Apr. 12, 2010 in U.S. Appl. No. 11/492,673, 11 pages.

Non-Final Office Action dated Nov. 25, 2008 in U.S. Appl. No. 11/075,573, 18 pgs.

Non-Final Office Action date Aug. 2, 2010 in U.S. Appl. No. 11/515,267; 14 pages.

Non-Final Office Action dated Dec. 16, 2009 in U.S. Appl. No. 11/684,637, 5 pgs.

Non-Final Office Action dated Jun. 11, 2009 in U.S. Appl. No. 11/210,272, 23 pgs.

Non-Final Office Action dated Jul. 20, 2009 in U.S. Appl. No. 11/930,147, 14 pgs.

Non-Final Office Action dated Jul. 2, 2009 in U.S. Appl. No. 11/331,113, 14 pgs.

Non-Final Office Action dated Jun. 20, 2008 in U.S. Appl. No. 11/210,272, 16 pgs.

Non-Final Office Action dated Dec. 1, 2009 in U.S. Appl. No. 11/831,938, 16 pgs.

Non-Final Office Action dated Mar. 13, 2009 in U.S. Appl. No. 11/278,416, 9 pgs.

Non-Final Office Action date Dec. 23, 2008 in U.S. Appl. No. 11/076,214,19pages.

Non-Final Office Action date Mar. 4, 2010 in U.S. Appl. No. 11/076,214, 13 pages.

Non-Final Office Action Mar. 12, 2010 in U.S. Appl. No. 11/150,653 29pages.

Non-Final Office Action dated May 13, 2009 in U.S. Appl. No. 11/685,101, 10 pgs.

Non-Final Office Action dated Sep. 23, 2008 in U.S. Appl. No. 11/684,637, 5 pgs.

Non-Final Office Action dated Apr. 28, 2009 in U.S. Appl. No. 11/515,267, 9 pgs.

Non-Final Office Action dated Sep. 10, 2008 in U.S. Appl. No. 11/515,267, 9 pgs.

Non-Final Office Action dated Jun. 30, 2008 in U.S. Appl. No. 11/075,573, 19 pgs.

Non-Final Office Action dated Apr. 29, 2008 in U.S. Appl. No. 11/458,384, 24 pgs.

Notice of Allowance dated Jun. 10, 2010 in U.S. Appl. No. 11/684,637; 8 pages.

Notice of Allowance dated Nov. 2, 2009 in U.S. Appl. No. 11/685,101, 6 pgs.

Notice of Allowance dated Aug. 27, 2009 in U.S. Appl. No. 11/684,637, 4 pgs.

Notice of Allowance dated Jan. 16, 2007 in U.S. Appl. No. 11/077,411, 4 pgs.

Paris et al., "Zero-delay broadcasting protocols for video-on-demand", International Multimedia Conference Proceedings of the seventh ACM international conference on Multimedia, Florida, 1999, pp. 189-197. Download: http://portal.acm.org/citation.cfm?id=319600.

Paris et al.: "Zero-delay broadcasting protocols for video-on-demand", ACM Multimedia, Proceedings of the International Conference, New York, NY, US, Oct. 30, 1999, 9 pages.

Petition to Make Special dated Oct. 31, 2005 in U.S. Appl. No. 11/075,573, 16 pgs.

Petition to Make Special dated Mar. 9, 2005 in U.S. Appl. No. 11/077,411, 52 pgs.

U.S. Appl. No. 11/974,138, filed Oct. 11, 2007, Ganesan et al.

"Video-on-Demand Research", printable at http:||www.cs. ndsu. nodak.edu/-rvetter|ATM/html/video. html.

Final Office Action mailed Jan. 2, 2009 in U.S. Appl. No. 11/226,625, 23 pgs.

Jehan-Francois Paris et al., "Zero-Delay Broadcasting Protocols for Video-on-Demand," Proceedings of the 7th ACM International Conference on Multimedia '99, Oct. 30-Nov. 5, 1999, Orlando, FL, USA. ACM ,1999, vol. 1.

Non-Final Office Action mailed Jul. 9, 2008 in U.S. Appl. No. 11/226,625, 20 pgs.

Rush_Hour_2_Movie_Poster.pdf, www.imdb,com KEY WORD: "Rush Hour 2".

"Google-2005-ScreenShot (Google Inc., Copyright 2005; http://web.archive.org/web/200601 01175628/www.google.com/, 3 pages)."

Decision on Petition to Make Special dated Dec. 18, 2007 in U.S. Appl. No. 11/974,138, 2 pgs.

International Search Report and Written Opinion of the International Searching Authority inInternational Application PCT/US2008/071735, European Patent Office, Feb. 19, 2009, 11 pages.

Non-Final Office Action dated Jul. 17, 2009 in U.S. Appl. No. 11/226,625, 21 pgs.

Non-Final Office Action dated Jun. 26, 2008 in U.S. Appl. No. 11/203,021, 15 pgs.

Non-Final Office Action dated Jun. 25, 2008 in U.S. Appl. No. 11/458,385, 9 pgs.

Non-Final Office Action dated Oct. 7, 2008 in U.S. Appl. No. 11/383,751, 8 pgs.

Petition to Make Special dated Oct. 10, 2007 in U.S. Appl. No. 11/974,138, 9 pgs.

Final Office Action dated Nov. 19, 2010 in U.S. Appl. No. 11/226,625; 26 pages.

Final Office Action dated Nov. 9, 2010 in U.S. Appl. No. 11/974,138; 17 pages.

Non-Final Office Action dated Dec. 14, 2011 in U.S. Appl. No. 11/974,138.

Non-Final Office Action dated Jul. 19, 2010 in U.S. Appl. No. 11/226,625.

Refernces Cited in Non-Final Office Action Dated Jun. 20, 2008 for U.S. Appl. No. 11/210,272.

Refernces Cited in Non-Final Office Action Dated Jun. 11, 2009 for U.S. Appl. No. 11/210,272.

Refernces Cited in Final Office Action Dated Mar. 16, 2010 for U.S. Appl. No. 11/210,272.

Refernces Cited in Non-Final Office Action Dated Aug. 3, 2011 for U.S. Appl. No. 11/210,272.

Refernces Cited in Non-Final Office Action Dated Sep. 25, 2013 for U.S. Appl. No. 11/210,272.

Refernces Cited in Final Office Action Dated Apr. 16, 2012 for U.S. Appl. No. 11/210,272.

Refernces Cited in Notice of Allowance Dated Jan. 7, 2014 for U.S. Appl. No. 11/210,272.

* cited by examiner

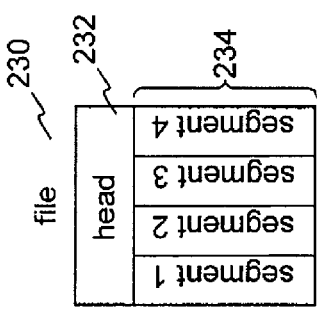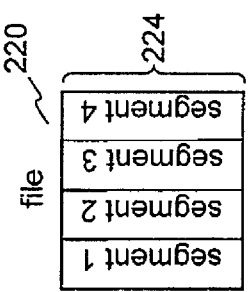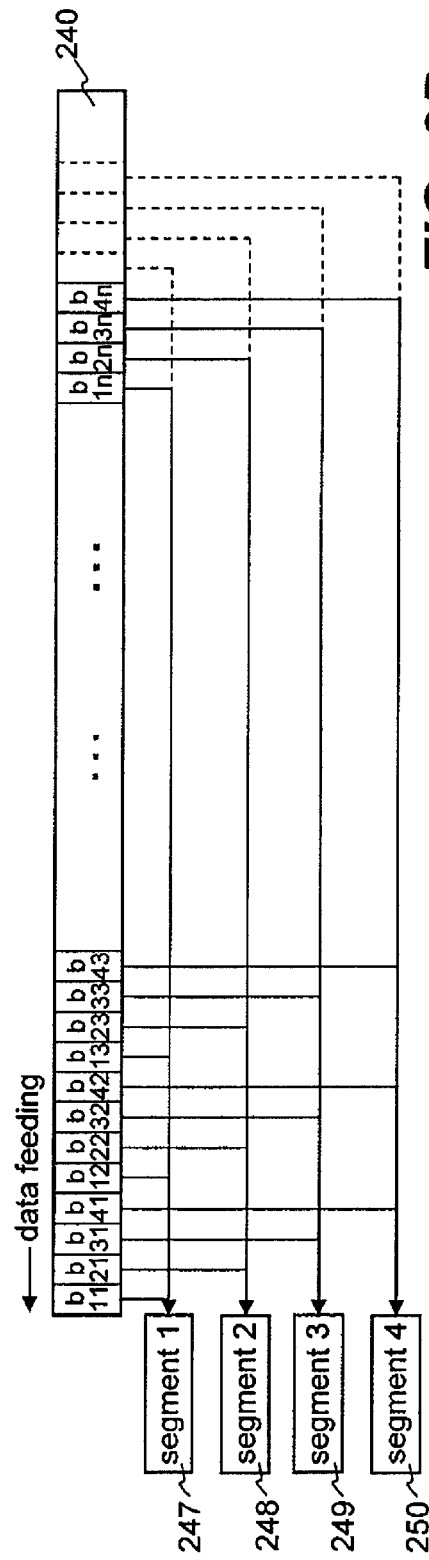

FIG. 4B

| 330 | 332 | 334 | 336 | 338 | 340 | 342 |
|---|---|---|---|---|---|---|
| Local/machine | IP Address | Time-fill (1~5000) | title1 | title2 | ... | title 5000 |
| Box 1 | address 1 | Program1 | seg1 seg3 | seg4 | | seg4 |
| Box 2 | address 2 | Program2 | seg3 seg4 | seg1 | | |
| Box 3 | address 3 | Program3 | seg2 seg3 | seg4 | | |
| ... | | | | | | |
| Box N | address n | Program4 | seg1 seg3 | seg3 | | seg1 |

FIG. 4C

| 350 | | Self | 306-n | 306-3 | 306-1 |
|---|---|---|---|---|---|
| | seg1 | IPA1 | | | |
| | seg2 | | IPA2 | | |
| | seg3 | | | IPA3 | |
| | seg4 | | | | IPA4 |

FIG. 4D

| 352 | box1 | back up | box2 | back up | box3 | back up | box4 | back up |
|---|---|---|---|---|---|---|---|---|
| seg1 | IPA1 | IPA | | | | | | |
| seg2 | | | IPA2 | IPA | | | | |
| seg3 | | | | | IPA3 | IPA | | |
| seg4 | | | | | | | IPA4 | IPA |

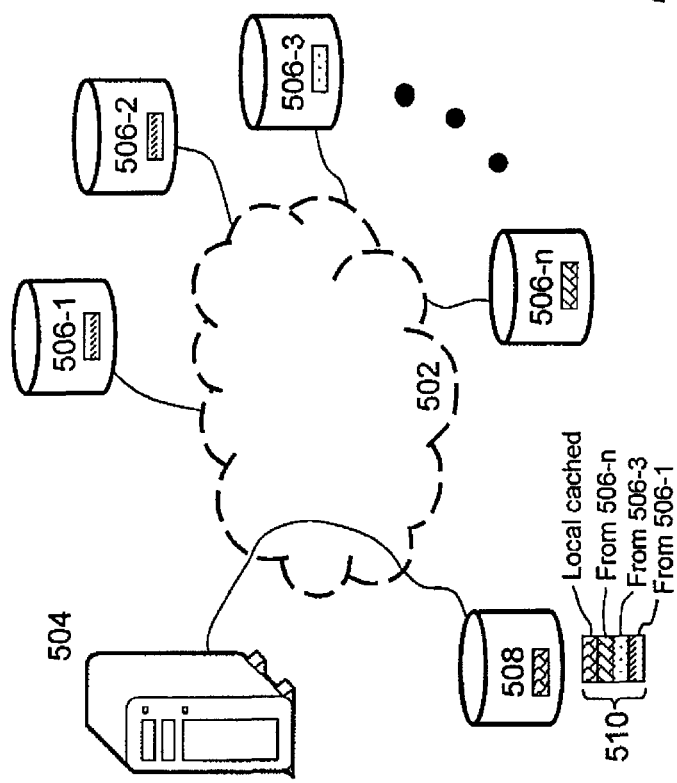

MULTIPLE AUDIO STREAMS

CROSS REFERENCE TO RELATED APPLICATIONS

This application is a continuation of co-pending U.S. application Ser. No. 11/492,673, filed Jul. 24, 2006, entitled "Multiple Audio Streams;"

This application is also a continuation-in-part of U.S. application Ser. No. 11/388,613, filed Mar. 23, 2006, now U.S. Pat. No. 8,018,995 entitled "System and Method for Trick Play of Highly Compressed Video Data;"

This application is also a continuation-in-part of U.S. application Ser. No. 11/331,113, filed Jan. 10, 2006, now abandoned entitled "Access Control of Media Services Over an Open Network;"

This application is also a continuation-in-part of U.S. application Ser. No. 11/075,573, filed Mar. 9, 2005, now U.S. Pat. No. 8,219,635 entitled "Continuous Data Feeding in a Distributed Environment;"

All of the aforementioned applications are incorporated herein by reference in their entirety for all purposes.

BACKGROUND

1. Technical Field

The present invention is generally related to multimedia delivery over the Internet. Particularly, the present invention is related to techniques providing media services including movies with multiple audio streams on an open network, such as the Internet.

2. Description of the Related Art

Continuous or on-demand media data such as video and audio programs have been broadcasted over data networks (e.g., the Internet). Broadcast of such media information over data networks by digital broadcasting systems provides many advantages and benefits that cannot be matched by current television cable systems or over-the-air broadcasting.

With the media-over-network systems, service providers are often able to draw viewers into an exciting, interactive and enhanced television or viewing experience. Video-On-Demand (VOD) or Near Video-On-Demand (NVOD) collectively referred to herein as VOD programs are examples of the interactive television programs typically provided by a service provider to its subscribers. VOD programs are video sessions that subscribers can order whenever they want or per NVOD schedules. FIG. 1 shows a video delivery system 100 that is commonly used for delivering VOD programs over a network. The video delivery system 100 includes a video server 102 that is sometimes referred to as a head-end. Through a data network 104, the video server 102 can provide continuous, scheduled and video-on-demand (VOD) services to respective client machines 106-1, 106-2, ... 106-n (i.e., its subscribers). The server 102 is further coupled to a media storage device 112 that may be configured to store various media files (e.g., movies or news footage). The media storage device 112 must be on-line, store and supply titles scheduled or demanded for delivery to any of the client machines 106-1, 106-2, ... 106-n.

To ensure quality of service (QoS), the bandwidth requirement of the network path (e.g., 108-1, 108-2, ... 108-n) to each of the client machines 106-1, 106-2, ... 106-n has to be sufficient. However, as the number of the subscribers continues to increase, the demand on the bandwidth of the backbone network path 110 increases linearly, and the overall cost of the system 100 increases considerably at the same time. If the server has a fixed bandwidth limit and system support capability, an increase in the number of subscribers beyond a certain threshold will result in slower transfer of data to clients. In other words, the transmission of the video data over the network 104 to the subscribers via the client machines 106-1, 106-2, ... 106-n is no longer guaranteed. When the video data is not received in a client machine on time, the display of the video data may fail or at least become jittery.

To alleviate such loading problem to the video server 102, a video delivery system often employs multiple video servers as rendering farms, perhaps in multiple locations. Each of the video servers, similar to the video server 102, is configured to support a limited number of subscribers. Whenever the number of subscribers goes beyond the capacity of a video server or the bandwidth thereof, an additional video server needs to be deployed or additional bandwidth needs to be allocated. Subsequently, overall costs go up considerably when more subscribers sign up with the video delivery system 100.

Although more servers may be added to accommodate more subscribers, the implementation of the video server 102 present many challenges to consider in delivering programs over an open network. In general, movies come with a number of different audio tracks. Typically, a movie may include respective audio tracks in English, Spanish, French, Chinese, or other languages. Streaming multiple audio streams for each video increases the bandwidth requirements of the network. Increasing the bandwidth requirement for multiple audio tracks makes the overall cost of the system 100 too costly and may not be practically possible.

There have been various effort towards providing multiple audio tracks for a movie. One approach is to treat video with different audio tracks as different movies. For example, a video with English audio track is treated as a different movie from the same video with Spanish audio track. However, such an approach wastes storage space and bandwidth by duplicating videos for different audio tracks.

Thus, there is a need for improved techniques for cost effective ways for service providers to deliver programs with multiple audios to subscribers over an open network.

SUMMARY

This section is for the purpose of summarizing some aspects of embodiments of the present invention and to briefly introduce some preferred embodiments. Simplifications or omissions in this section as well as the title and the abstract of this disclosure may be made to avoid obscuring the purpose of the section, the title and the abstract. Such simplifications or omissions are not intended to limit the scope of the present invention.

In general, the present invention relates to techniques for providing media services over an open network. To ensure that multiple audio streams are available for a video, the present invention provides techniques for encoding and sending multiple audio streams, and single video stream into a transport—seeding a "fat" transport. Then, streaming a transport with a single audio and a single video with other audios filtered out to a subscriber—streaming a "lean" transport.

According to another embodiment, the embodiment comprises encoding and sending each video and audio stream separately, then streaming a transport with requested single audio and single video in real-time.

According to one aspect of the present invention, data pertaining to a title is divided or organized into several segments that are distributed among boxes in service. General orders of titles being offered in a library are fulfilled by a group of selected client devices (e.g., boxes) delivering respective segments to an ordering box. Special orders of certain programs (e.g., a live event or a rare title not included in the library) are fulfilled directly by a server. In addition, the server is configured to supply some of the segments to an ordering box or back up any one of the selected boxes designated to supply the needed data to an ordering box. Because of its inherent superior computing power and more bandwidth, the server may deliver more than one segment at a time. The architecture contemplated in the present invention offers the flexibilities of being relatively independent from the number of users while, at the same time, offering centralized management or services to the users. The present invention inherently distributes load among client devices in service by using the computing power and bandwidth collectively available at any time in the client devices. Furthermore, much of the traditional server functionality now gets distributed among the client devices in service.

Embodiments of the invention may be implemented in numerous ways, including a method, system, device, or a computer readable medium. Several embodiments of the invention are discussed below. In one embodiment, the invention provides a method of providing media services over a network, the method comprises: receiving a request from one of a plurality of boxes (hereinafter "ordering box"), the request including an order of a title and an audio. The embodiments further comprise identifying one or more of the boxes other than the ordering box to provide distributed segments pertaining to the title to the ordering box, wherein the ordering box proceeds with downloading the distributed segments, and a playback of the title based on the distributed segments together with residing segments, if any, is started or continued.

According to another embodiment, the invention provides a system for providing media services, the system comprises a server coupled to a network and configured to manage the medial services, and a plurality of boxes coupled to the network, wherein one of the boxes (herein after "ordering box") initiating a request including an order of a title communicates directly with the server configured to proceed with identifying one or more of the boxes other than the ordering box to provide distributed segments pertaining to the title to the ordering box, wherein the ordering box proceeds with downloading the distributed segments, and a playback of the title based on the distributed segments together with residing segments, if any, is started or continued. One of the objects, features, and advantages of the present invention is to provide various techniques related to streaming multiple audio tracks based on a distributed architecture, a client-server architecture, and a hybrid architecture taking the benefits, features, and advantages of both distributed architecture and client-server architecture.

It should be understood that each technique so described herein has its own distinctive features, and all techniques in combination yield an equally independently novel combination as well, even if combined in their broadest sense; i.e., with less than the specific manner in which each of the techniques has been reduced to practice.

Other objects, features, and advantages of the present invention will become apparent upon examining the following detailed description of an embodiment thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which:

FIG. 3B, according to one embodiment, a file is being organized or fragmented in terms of four segments;

FIG. 3C shows another embodiment in which a file is being organized or fragmented in terms of a head and four segments, where the head is always locally cached;

FIG. 3D shows a data stream representing a file or a majority of a file, the file is being divided into four segments;

FIG. 4B shows an exemplary source information shown as a map illustrating how a library of 5000 movie titles is distributed across N boxes;

FIG. 4C shows a source information map corresponding to FIG. 3B, where three other boxes are designated to supply the needed three segments that are together assembled with the locally cached segment to facilitate the playback of the ordered movie;

FIG. 4D shows exemplary source information with backup boxes in a table 352 that includes a backup identifier (shown as an IP address) for each of the designated boxes;

FIG. 6 shows an exemplary configuration in which the present invention may be practiced;

DETAILED DESCRIPTION OF THE INVENTION

The present invention is related to techniques of providing multiple audio streams of media services based on a distributed architecture or a hybrid architecture taking the benefits, features, and advantages of both distributed architecture and client-server architecture. Different from a prior art system in which one video with different audio tracks are treated as different movies, multiple audio streams and a single video are encoded together and sent to a number of boxes, a single audio and a single video are streamed to an ordering box with other audio tracks filtered out by boxes acting as a media content provider. Alternatively, each video and audio is encoded and sent separately to a number of boxes, a single audio and a single video are encoded at a number of boxes to be streamed to the ordering box. As a result, multiple audio streams are provided for a single video without using increased bandwidth.

In the following description, numerous specific details are set forth to provide a thorough understanding of the present invention. The present invention may be practiced without these specific details. The description and representation herein are the means used by those experienced or skilled in the art to effectively convey the substance of their work to others skilled in the art. In other instances, well-known methods, procedures, components, and circuitry have not been described in detail since they are already well understood and to avoid unnecessarily obscuring aspects of the present invention.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments mutually exclusive of other embodiments. Further, the order of blocks in process, flowcharts or functional diagrams representing one or more embodiments do not inherently indicate any particular order nor imply limitations in the invention.

Embodiments of the present invention are discussed herein with reference to FIGS. 2-9. However, those skilled in the art will readily appreciate that the detailed description given herein with respect to these figures is for explanatory purposes only as the invention extends beyond these limited embodiments.

Figure 1:
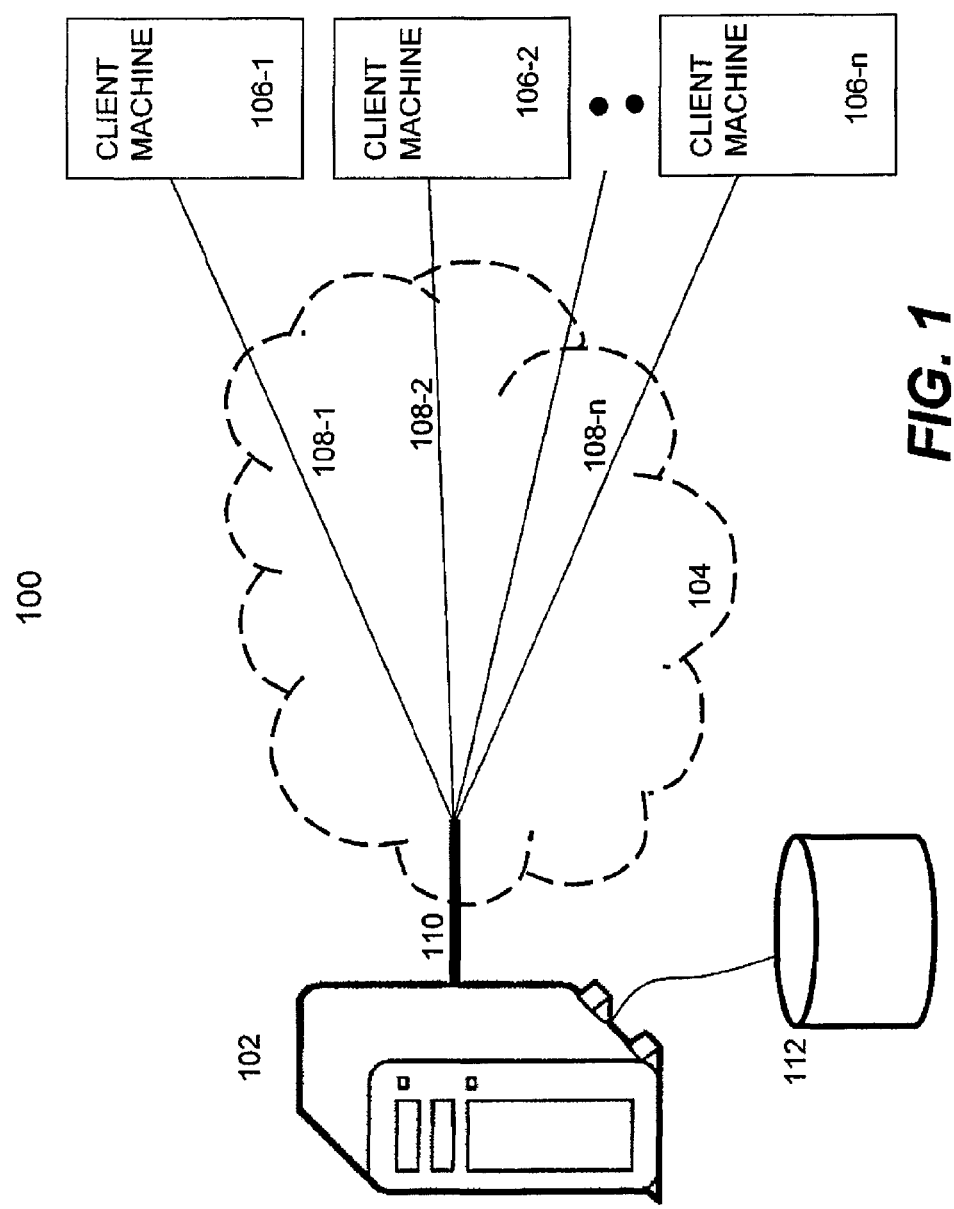
FIG. 1 shows a video delivery system that is commonly used for delivering video services over a network, also referred to as a server-and-client architecture.
Figure 2:
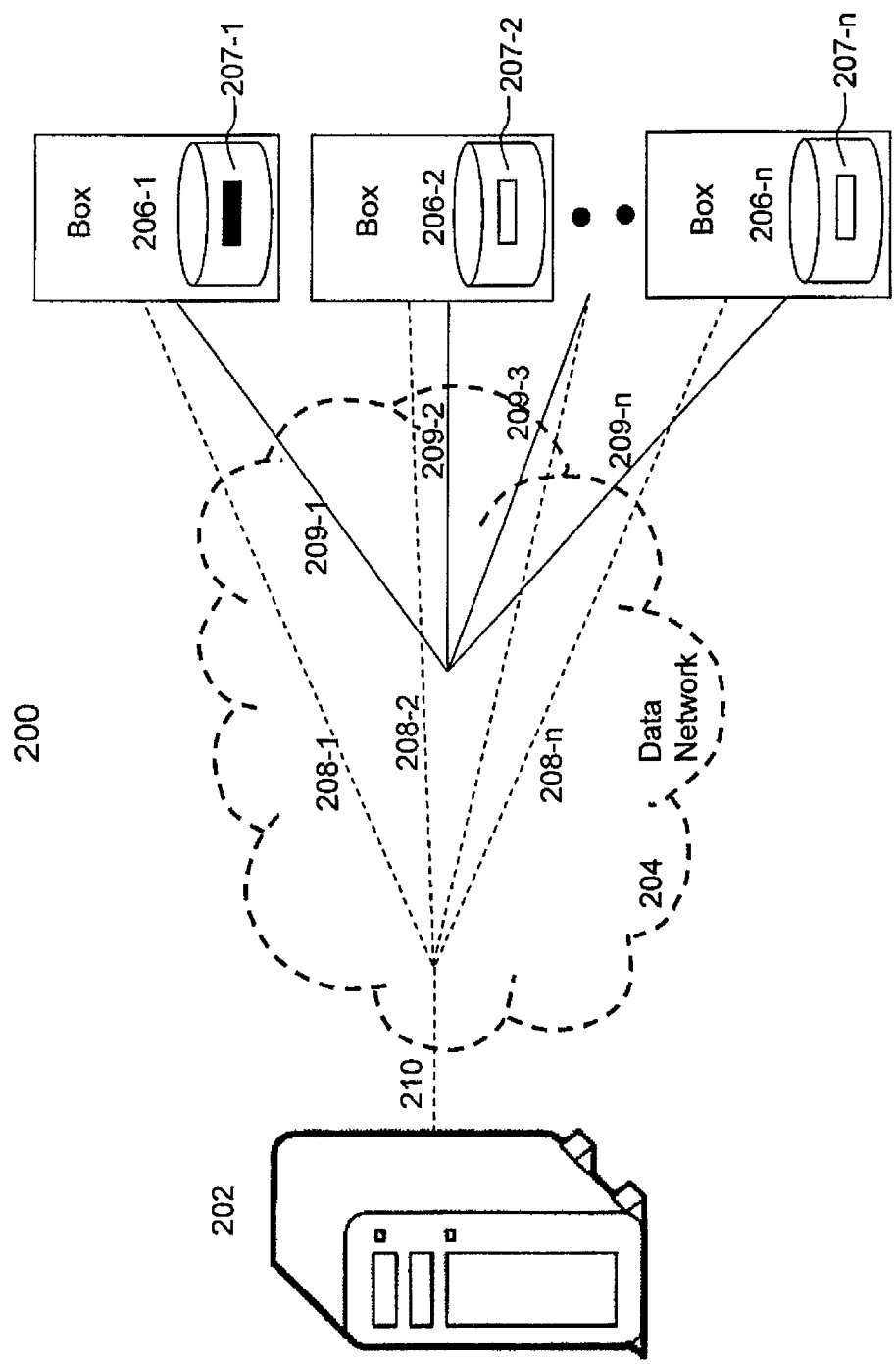
FIG. 2 shows a configuration of a distributed network system in accordance with an embodiment of the present invention.

Shown as FIG. 2 of U.S. patent application Ser. No. 11/075, 573, FIG. 2 herein shows an exemplary configuration 200 of a distributed network system 100. A server 202, presumably managed and/or populated by a service provider, is configured to handle the delivery of video (or multimedia) services to users via local machines or boxes 206-1, 206-2, ... 206-n. Different from the video server 102 of FIG. 1 that delivers video data to a subscriber upon receiving a request therefrom, the server 202 is not responsible for delivering the content in response to a request from a user, and instead is configured to provide source information as to where and how to retrieve at least some of the content from other boxes. In other words, the server 102 of FIG. 1 requires the media storage device 112 to provide the content when any of the client machines 106-1, 106-2, ... 106-n is being serviced, while the server 202 does not need necessarily a media storage device to provide the content. Instead, some of the boxes 206-1, 206-2, ... 206-n are respectively configured to supply part or all of the content to each other.

According to one embodiment, when fulfilling a request from a local machine or a box (e.g., 206-1), communication between the server 202 and the box 206-1 over the network paths 208-1 and 210 may be limited to small-scale requests and responses (e.g., of small size and very infrequent). A server response to a request from a box may include source information (e.g., identifiers), authorization information and security information. Using the response from the server 202, the box may be activated to begin playback of a title (e.g., 207-1). Substantially at the same time, the box may initiate one or more requests to other boxes (e.g., 206-2 and 206-n) in accordance with the source identifiers to request subsequent portions of the title (e.g., 207-2 and 207-n). Assuming proper authorization, the requesting box receives the subsequent portions of the data concurrently from the other boxes. Because of box-to-box communication of content over the path 209, the bandwidth requirement for box-to-server communications over the network paths 208-1 and 210 is kept low and typically short in duration. In the event there are a large number of user boxes issuing playback requests substantially at the same time, the bandwidth of the backbone path 210 should be sufficient to avoid noticeable or burdensome delay.

The contents available in a library being offered in any of the boxes 206-1, 206-2, ... 206-n are originally provided by one or more content providers. Examples of the content providers include service satellite receivers, television relay stations, analog or digital broadcasting station, movie studios and Internet sites. Depending on implementation, the contents may be initially received or originated in the server 202. Instead of maintaining and managing the content in a large storage device, the server 202 is configured to distribute the content or files to a plurality of local machines registered with the server 202. The boxes 206-1, 206-2, ... 206-n shown in FIG. 2 are examples of local machines in service. Unless there is a need for a backup copy, the server 202 at any time has no need to keep a copy of the content. On the other hand, unless there is a special need to keep a complete copy of an extremely high-demand title in a box, none of the boxes in service has a complete copy of a title until an order is placed. Consequently, with embedded security in the distributed objects, some embodiments of the present invention may alleviate the concern of electronic piracy and widespread distribution (e.g., by hacking or illegal duplication).

For convenience, it is assumed herein that a file pertaining to a title is played back when the title is selected and ordered by a user. When an order for a title is placed, a corresponding file must be available for playback. One of the features in the system 200 is that a file, or at least a portion thereof, regardless of its size, can be accessed instantaneously, thereby realizing instantaneous VOD. According to one embodiment, where a file is 840 Mbytes on average and a box includes a storage capacity of 300 Gbytes, a system may offer a large library of titles (e.g., 5000) for access at any time instantly. In the prior art, if the files for the titles must be stored in advance to offer instantaneous playback, the local storage of a box would have to have a capacity of 4,000 Gbytes, consequently, rendering instantaneous VOD economically impractical.

According to one aspect of the present invention, only a beginning portion (referred to as a "head") and possibly one or more tail segments of a file are locally cached in a box. Such locally cached segments are referred to as residing objects or segments, while segments not residing locally are referred to as distributed objects or segments. When a title is selected, the head of the corresponding file is instantly played back. During the time the head is being played, the distributed objects corresponding to the title are retrieved simultaneously from other boxes. When the head is finished, the received parts of the distributed segments being streamed in from other boxes is combined with residing segments for the title, if any, to enable a continuous playback. Depending on the popularity and concurrent demand for a particular title, the number of residing objects may be increased or decreased to control the dependency of each box on other boxes for playback. Typically, the more residing objects for a title a box has, the more distributed copies of the title there are in the entire system and thus the less dependency of the ordering box on the other boxes.

In one embodiment, the head is always played first to ensure an instant playback. In another embodiment, the head size is reduced to zero, in which case, a time-fill program is played first to provide a time frame that is sufficient enough to fetch and assembly the beginning data portion of the segments either locally available or from other boxes. Depending on implementation, the time-fill program may include one or more trailers related to the title being ordered, various notifications/updates or commercial programs. The time-fill program may be locally configured. In one embodiment, the time-fill program is provided to give a time frame in which data being fetched from one or more other devices can be stabilized. In another embodiment, the time-fill program provides a platform for sponsors that hope to display their respective programs to audience. Orders or slot positions for these programs in a time-fill program may be auctioned.

Various content streams include IP packets that are directed to appropriate channels for delivery over the data network. The IP packets include IP data representing the content of the programs. Prior to transmission over the data network, the IP packets are encrypted by a conditional access encryption unit 710. Once the IP data is encrypted, the Slicing unit 712 slices the data stream in segments of data stream as described further below.

Referring to FIG. 3B, there shows an embodiment in which a file 220 is being organized or fragmented in terms of four segments 224. In general, the file 220 representing a collection of all data pertaining to a title may be divided into any number of segments in consideration of a required transmission rate (e.g., related to the encoding and decoding rates for successful playback), and the minimum uploading and downloading capabilities of a network, or even dynamically and adaptively selected depending on the selected serving boxes at run-time and in real-time during the transmission. FIG. 3C shows another embodiment in which a file 230 is being organized or fragmented in terms of a head 232 and four segments 224, where the head 232 is always locally cached. One of the advantages of having a head locally cached is to facilitate an instantaneous playback after a movie is ordered. While the head is being played back, the needed segments are retrieved from other designated boxes. It can be appreciated the length of a head may be predefined or dynamically determined to provide a time buffer (e.g., 5 minutes) sufficiently to retrieve part of the data from the distributed segments for assembling with that of any locally cached segments, if any. As a result, an instantaneous VOD system may be realized.

Regardless whether a head is used or not, a file or a majority of a file will be fragmented and the segments are distributed among the boxes in service. According to one embodiment, given a required transmission rate (e.g., 1 megabit per second or 1 Mbps), the minimum uploading and downloading speeds of a network are considered to determine a number that defines the segmentation, and thus the dependency on other boxes and the support for concurrent demands of a particular title.

It is assumed that a minimum uploading speed is U and a required transmission rate is D, and D/U=K<k, where k is the smallest integer greater than K. In one embodiment, a file or a majority of a file is preferably divided into k segments to optimally utilize the uploading speed of U, assuming that the downloading speed is at least k times faster than the uploading speed. For example, in a POTS-based DSL network for residential areas, the required transmission may be about 1.0 Mbps while the uploading speed may be about 300 kbps. Hence, k=4. Assuming that an ordering box has a downloading speed four times the uploading speed of the other boxes, up to four segments in other boxes can be downloaded concurrently across the network as streaming into the ordering box without interruption.

FIG. 3D shows a data stream 240 representing a file or a majority of a file. The file 240 is divided into four segments 247-250. The segments 247-250 are created or formed by respectively sampling the file in a decimated manner. As a result, each of the segments includes a plurality of data blocks. Depending on an exact data length of the file 240, an n-th data block in each of the segments 247-250 is four successive data blocks in the file. In one embodiment, a data block comprises a chunk of data, for example, 256 Kbytes or 1 Mbyte.

As shown in FIG. 3D, the data stream 240 is expressed in data blocks as follows: b11, b21, b31, b41, b12, b22, b32, b42, b13, b23, b33, b43, . . . b1n, b2n, b3n, b4n. With the decimated sampling, the four segments 247-250 obtained can be respectively expressed as follows:

Segment 1={$b11, b12, b13, b14$ . . . };

Segment 2={$b21, b22, b23, b24$ . . . };

Segment 3={$b31, b32, b33, b34$ . . . }; and

Segment 4={$b41, b42, b43, b44$ . . . }.

where b stands for "data block", numerals after "b" are mere reference numbers. As used above, the data blocks b11, b21, b31, b41, b12, b22, b32, b42, b13, b23, b33, b43, . . . b1n, b2n, b3n, b4n are sequential while, for example, data blocks b11, b12, b13, b14 . . . b1n in Segment 1 are not sequential.

Because multiple audios are encoded, the fragmentation of the file is difficult:

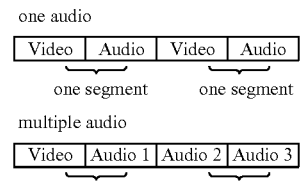

Segmentation is performed to the point where there is cutting into the middle of an audio.

Figure 8:
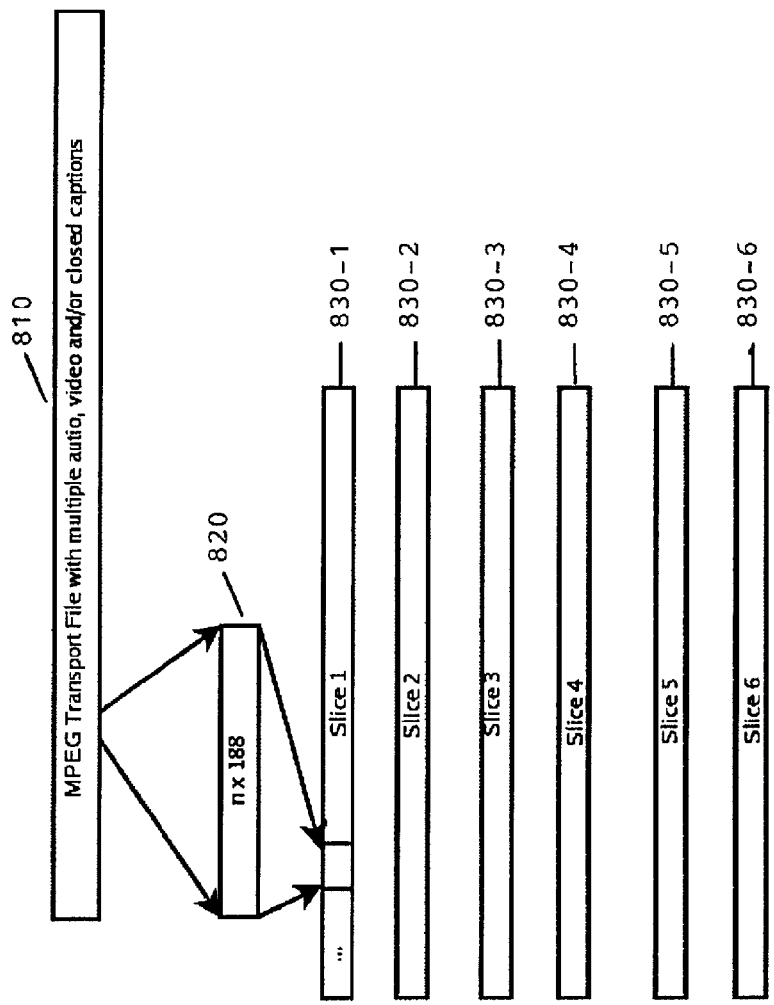
FIG. 8 shows fragmenting a multiple audio stream according to an embodiment of the present invention.

Referring to FIG. 8, when a stream 810 including a video, multiple audio, and/or closed captions is sliced, an interleaving block size of a multiple of 188 bytes 820 is chosen to ensure that the MPEG transport stream 188 byte packet is not cut off in the middle. This allows filtering of complete MPEG TS packets 830-1 . . . 830-6 in or out.

It should be noted, however, a head, if used, includes data blocks that are consecutive so that an instantaneous playback of the head is possible. It is evident that the data blocks in the segments are non-consecutive, interlaced or interleaved.

Figure 3A:
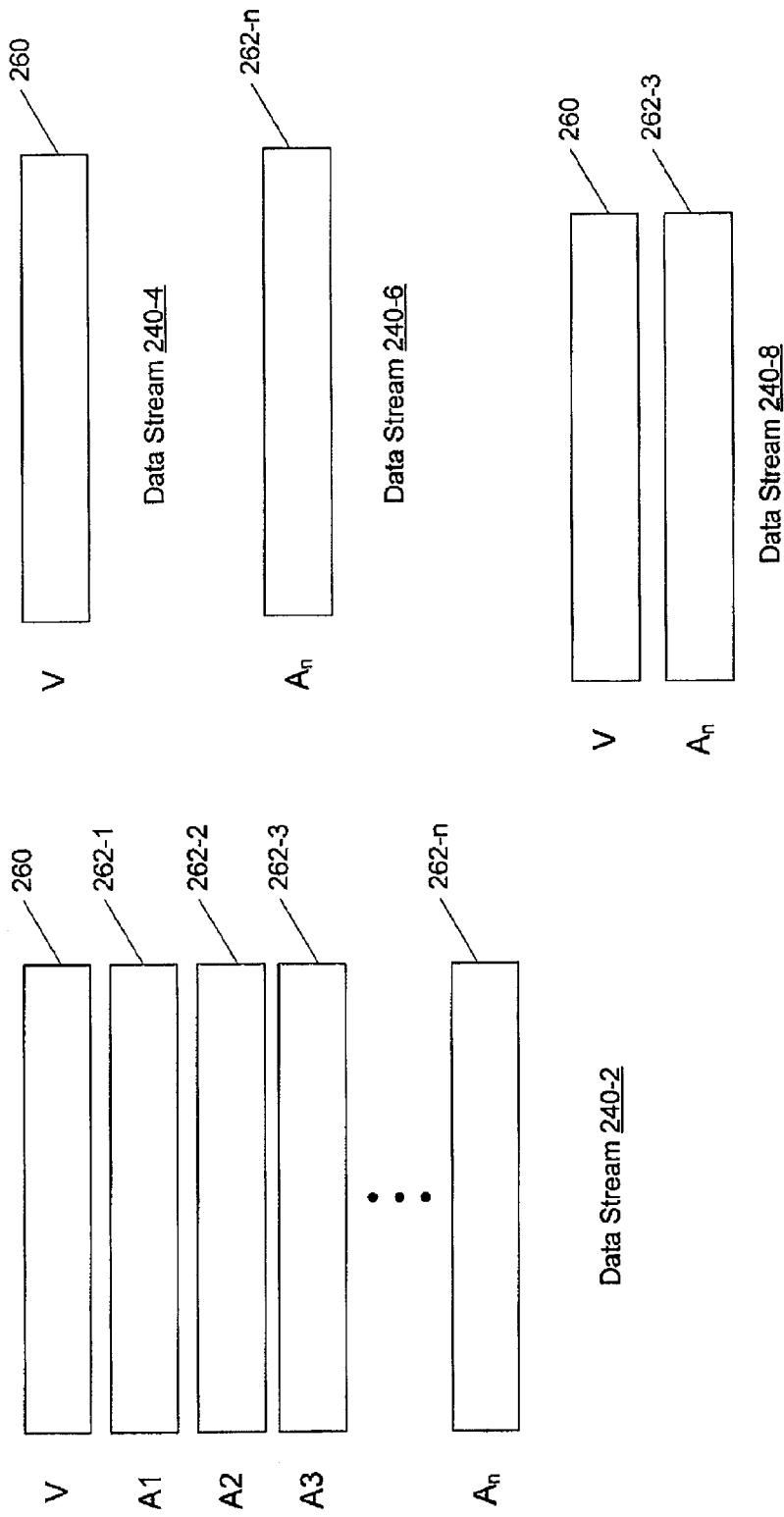
FIG. 3A shows data steams in accordance with one embodiment of the invention.

FIG. 3A illustrates different types of data streams according to embodiments of the present invention. The data streams 240-2 and 240-6 are the video and audio streams encrypted, sliced and sent to a number of designated boxes 206 over the network path 210 and 208 of FIG. 2A. Although, these data streams may be fetched and viewed by one of the boxes, typically the data streams are distributed to boxes for future distribution—hence fat seeding. There is no time limitation and this may be done over a period of time where the bandwidth is freely available. For example, this process of fat seeding may be done during the night when the network is not busy.

In one embodiment, the data stream 240-2 includes one single video 260 and multiple audios 262 associated with the video. For example, the video 260 may be a movie and multiple audios may be audios in different languages such as English, French, Spanish, Italian, Chinese, and etc. To ease the bandwidth requirement, the data stream may be sliced into smaller segments and distributed to the boxes. When a movie (i.e., a video and a particular audio stream) is requested by an ordering box, the boxes with different segments filter out the requested audio to be sent to the ordering box. For example, if the ordering box requests the video 260 with audio 262-3, then the boxes with segments for the requested video 260 filter out all other audios 262-1, 262-2 . . . 262-n, so that only audio 262-3 is sent with the video 260. Once the filtering is done, the requested data stream 240-8 which only includes the video 260 and audio 262-3 can be sent to the ordering box in real-time without wasting the bandwidth because it only has one video and one audio—hence a lean streaming.

Furthermore, the data stream 240-2 may include multiple audio and multiple closed captioning.

In another embodiment, fat seeding may be achieved by distributing video and audio streams 240-4 and 240-6 separately. For example, at the server 202, a video stream 240-4 is encrypted, sliced, and distributed to a number of boxes. An audio stream 240-6 is encrypted, sliced, and distributed to a number of boxes. This is repeated for the audio stream until all audios associated with the video is distributed to the boxes. At the boxes, the video and audio streams reside until an ordering box requests for the video and audio. The ordering box requests for a program that includes a video ID and an audio ID. Once the request is received by the server, the server instructs the boxes with segments to multiplex the requested video and audio. This is done by looking at the video ID and audio ID, and individual packet presentation and decoding time stamps. Once, segments of requested video and audio are multiplexed at the sending boxes, the segments of the data stream 240-8 which only includes one video and audio are forwarded to the ordering box over the path 209.

In both embodiments, distribution of one single video and multiple audios may be done gradually over the paths 210 and 208 from the server 202 to a number of boxes 206—fat seed. Once an ordering box makes a request, the number of boxes forwards a lean stream over the path 209 to the ordering box.

Figure 9:
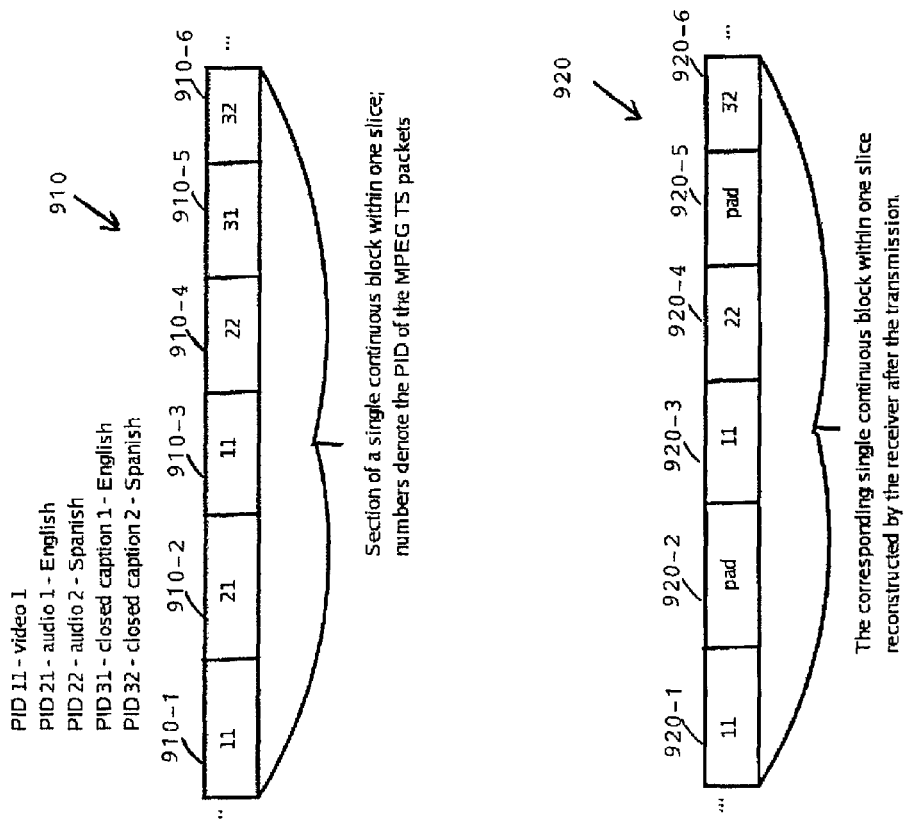
FIG. 9 shows replacing filtered out packets with padded packets according to an embodiment of the present invention.

Referring to FIG. 9, information about filtered out packets is also sent to the receiver including their PIDs, their location within the original block before filtering, etc. The original stream 910 includes video 1 910-1 and 910-3, audio 1 910-2, which can be English, audio 2 910-4, which can be Spanish, closed caption 1 910-5, which can be English, and closed caption 2 910-6, which can be Spanish. If a user selects video 1 and Spanish audio and closed caption, audio 1 910-2 and caption 1 910-5 are filtered out and only the requested packets are sent out. The sending server also sends information about the filtered out packets. This information allows the receiver side to reconstruct complete structure of the original stream 910, and insert padding MPEG TS packets 920-2 and 920-4 in place of the filtered out packets. Thus, the top level structure of the MPEG TS stream is preserved, and indexing for the original MPEG TS stream can remain valid and usable.

Figure 4A:
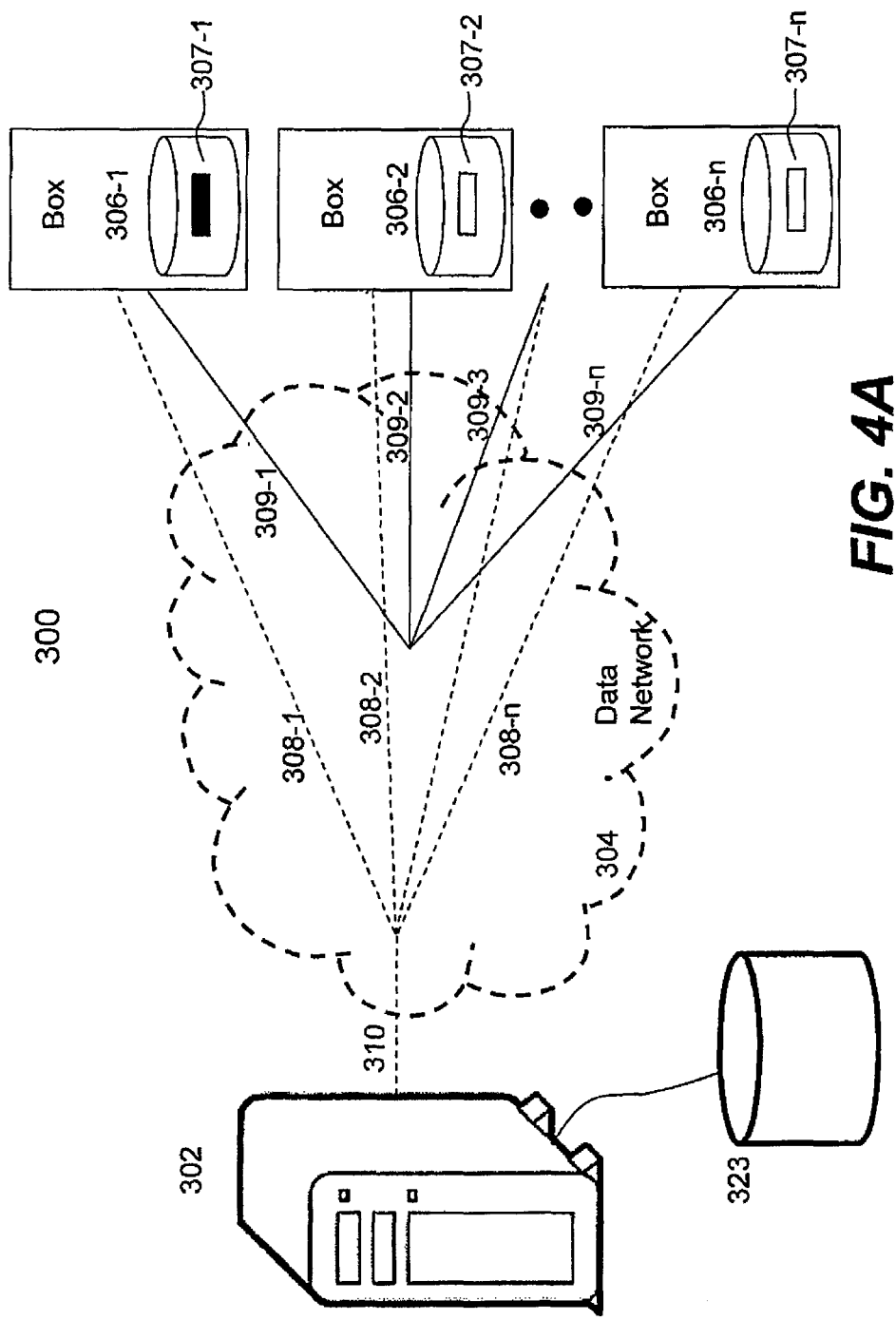
FIG. 4A shows an exemplary architecture that combines both the traditional client and server architecture of FIG. 1 and the distributed architecture of FIG. 2A.

Referring now to FIG. 4A, it shows, according to one embodiment of the present invention, an architecture 300 that combines both the traditional client-server architecture of FIG. 1 and the distributed architecture of FIG. 2A. One of the features, benefits and advantages of the architecture 300 is the underlying mechanism of using the computing capacity as well as the bandwidth in the client side to deliver media services while, at the same time, providing centralized services.

For example, the architecture 300 may be configured to deliver non-prerecorded programs such as live broadcasts by a multicasting protocol. The server 302 receives orders from some of the subscribers (e.g., for boxes 306-1 and 306-n) for a broadcasting event. When the event comes, the server 302 receives a streaming feed from a source (e.g., a televised site). The streaming is then delivered by the server 302 via the network path 310 to 308-1 and 308-n to the ordering boxes 306-1 and 306-n. As the subscriber for the box 306-2 did not order the event, the box 306-2 will not receive the streaming from the server 302. It can be appreciated that the number of recipients for the program does not affect the performance of the server 302 or demands higher bandwidth because the program is being multicast to the ordering boxes.

The architecture 300, at the same time, allows non-interrupted media services among the boxes. Similar to the description for FIG. 2, segments for each title in a library are distributed among the boxes in service. When the box 306-1 is used to order one of the titles in a library, the request is sent to the server 302 via the network path 308-1 and 210. The server 302 is configured to determine which other boxes are most appropriate to be the suppliers for providing the distributed segments. Either the server 302 causes the suppliers to contact the ordering box 306-1 to receive the needed segments or the ordering box 306-1 initiates communication with the suppliers upon receiving a response form the server 302, where the response includes information about the suppliers. In one embodiment, the information includes designation information (e.g., network addresses) as to who are the suppliers, security information as to how to decrypt the data, and other information to facilitate the playback of the ordered title.

FIG. 4B shows exemplary source information shown as a map 330 illustrating how a library of 5000 movie titles is distributed across N boxes. Column 332 lists all boxes in service. Each box is assigned a unique identifier for identification. Information in the column 332 may be viewed as the identifiers for the boxes in service. For example, box 1 is assigned a unique identifier of "Box 1" or a sequence of alphanumeric characters. The column 334 lists a corresponding IP address for each of the boxes listed in column 332. The Column 336 lists predetermined time-fill programs for all titles in the library. Depending on implementation, the time-fill programs may be identical or each of the time-fill programs is self-configured in accordance with what has been ordered. The column 338 lists what segments for title1 are residing in each of the boxes, assuming title1 is required to have two segments cached in each box. The column 340 lists what segment for title2 is residing in each of the boxes, assuming title2 is required to have one segment cached in each of the boxes. The column 342 lists what segment for title5000 is in a selected set of boxes, assuming title5000 is required to have one segment in these selected boxes. As a result, all segments in a box may be uniquely addressed for uploading to another box or playback of an ordered title locally.

FIG. 4C shows a source information map 350 corresponding to FIG. 3B. There are three other boxes 306-n, 306-3 and 306-1 designated to supply three needed segments that are together assembled with a locally cached segment to facilitate the playback of the ordered movie. It can be appreciated that relying on multiple sources to retrieve distributed segments to support a playback can be advantageously used in the architecture of current networks where the downloading bandwidth is typically a multiple of the uploading bandwidth.

FIG. 4D shows exemplary source information with backup boxes in a table 352 that includes a backup identifier (shown as an IP address) for each of the designated boxes. Should one of the boxes fail to respond to the request for a segment from the ordering box or the segment cannot be received correctly, the backup IP address is immediately called upon to switch to the corresponding backup box that is available to provide or continue to provide a segment that the originally designated box fails to provide.

Referring now back to FIG. 4A, It can be appreciated that at any time the server 302 may designate itself to be one of the suppliers to an ordering box. In other words, a supplier provided to an ordering box can be either another box in the network or the server itself. According to one embodiment, when the supplier is a server, it is capable of supplying more than one segment. Although it is possible for a designated box to supply more than one segment for a title at a time to an ordering box, it is preferable that a server is configured to do so because the server inherently has more computing power and bandwidth than a single box does. According to one embodiment, the server may provide only a portion of a segment in order to complement a supplier that provides another portion of the segment in case the supplier cannot upload the segment at a sufficiently high rate. According to one embodiment, the server may attempt to designate client boxes as suppliers for a title but may designate itself as a back-up box in case an originally designed client box fails in the process.

In one embodiment, when a server is designed to be one of the suppliers to service an ordering box, the server is not necessarily the one that provides the designation information. A service provider may deploy several servers, each is designated to cover a specific area in accordance with one or more specification (e.g., popularity, geography, demographics, and/or like criteria).

According to one embodiment, the server 302 is configured to provide titles that are not widely distributed among the boxes in service. It is understood that the distributed architecture as described in FIG. 2 can provide a library with a large number of titles in a box with a limited capacity of storage. These titles are presumably popular among the subscribers. However, there may be some less popular titles for which the overhead of storing many copies of its segments on different boxes may be too high, or for which the number of copies available in the network may be insufficient to address a temporary spike in demand for that title. In addition, there may be many titles that are newly introduced into the library and that have not yet been seeded into the boxes in the field. The server 302 can be configured to fulfill the need for serving such titles. According to one embodiment, a storage space 323 is provided to store data related to such rare or newly introduced titles that are not included in a library being offered. Streaming pertaining to such titles may be provided to an ordering box, in which case the data is provided by a unicast protocol. According to one embodiment, the server 302 is configured to provide any title in the library during periods of high demand in the system when there are an insufficient number of client boxes to service all the requests for different titles in the system.

Figure 5A:
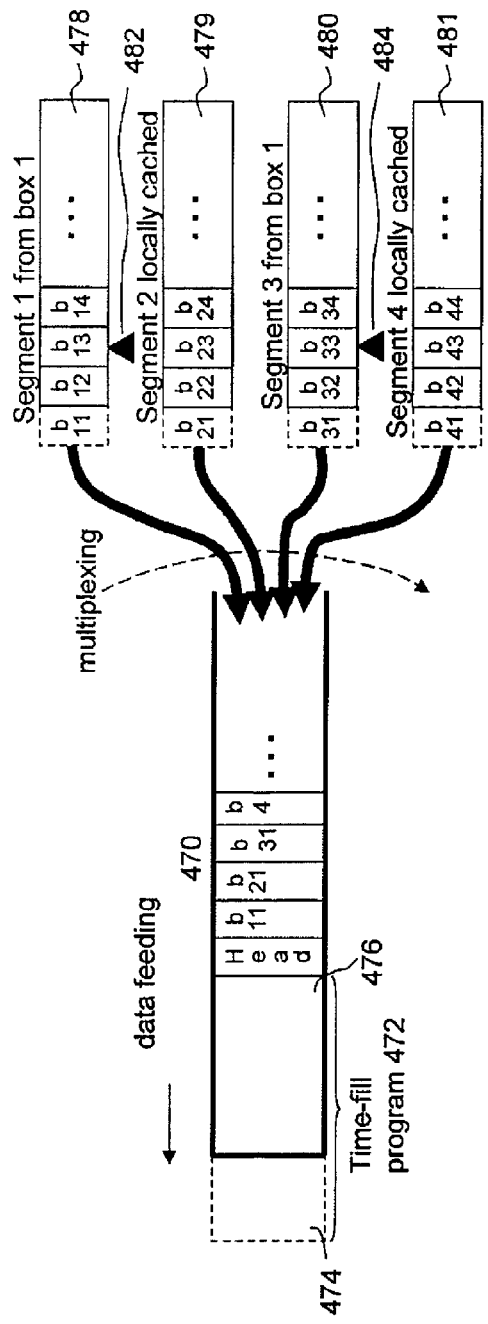
FIG. 5A shows an embodiment of an ordering box retrieving and assembling segments to support a playback of a selected movie.

Referring now to FIG. 5A, there shows an embodiment of an ordering box retrieving and assembling segments to support a playback of a selected movie. If all segments are streaming at predetermined minimum speeds, then, at 476, portions of the segments locally stored and the portions of the segments being streamed in are multiplexed into a buffer as shown in FIG. 4A. A portion 474 of the time-fill program 472 has been played out of the buffer 470. The remaining portion 476 of the time-fill program 472 is yet to be played. At the same time, the streaming of segments 478 and 480 is being fed into the buffer 470. Segments 478-481 (including the segments locally stored and the segments being streamed in) are multiplexed into the buffer 470. More specifically, a block of data from segment 1, a block of data from segment 2, a block of data from segment 3 and a block of data from segment 4 are multiplexed and successively fed into the buffer 470. As a result, the original order of the data is restored and the remaining portion of the file pertaining to the title is assembled.

To facilitate the continuation of a data stream, each of the pointers 482 and 484 is used to remember where the data block of a segment is being fed or about to be fed to the buffer 470. In the event, the segment being fetched from a box is interrupted and a backup box needs to step in, the ordering box knows exactly where to start fetching the segment from where it was interrupted in accordance with the pointer. Likewise, similar pointers (not shown) may be provided to remember where the data block of the locally cached segment is being fed or about to be fed to the buffer 470. In the event, the ordering box needs to be reset or is suddenly powered off and back on, these pointers can facilitate the continuation of the playback of the ordered movie.

Figure 5B:
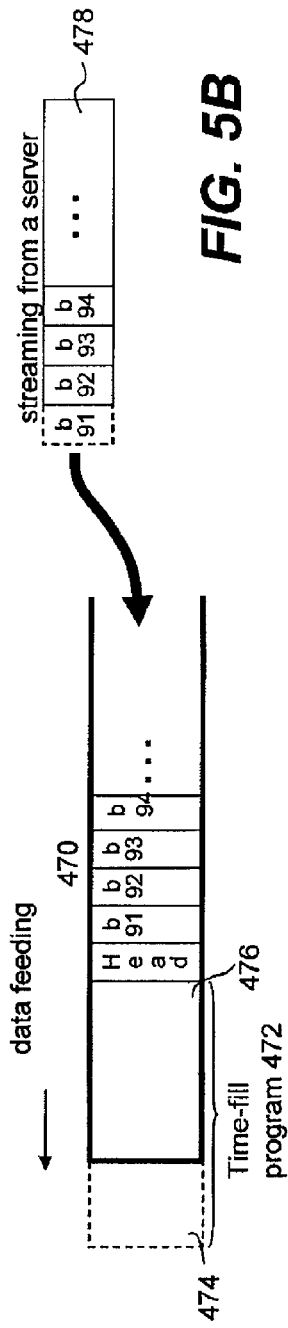
FIG. 5B shows an embodiment of an ordering box receiving streaming directly from a server.

FIG. 5B shows an embodiment of an ordering box receiving streaming directly from a server. Different from the multiplexing operation shown in FIG. 5A, the ordering box is configured to buffer the data of the streaming into the buffer 470 that is provided to minimize any possible instability or interruption of the streaming. In operation, once an order is placed, a time-fill program 472 is instantly played. At the same time, a data sequence from a server is being fetched and put into the buffer 470. As soon as the time-fill program 472 is done, the buffered portion of the data is started. Not shown in FIG. 5B, data pointers may be used in FIG. 5B to facilitate the continuation of the playback of the data in case the ordering box is accidentally out of operation and turned back on.

It should be readily understood to those skilled in the art that the above description may be equally applied to cases in which instantaneous VOD services are desired. Instead of playing back the time-fill program, a head of a movie title can be played back first, during which the remaining segments, if not locally available, can be fetched from other designated boxes.

Referring now to FIG. 6, there shows an exemplary configuration in which the present invention may be practiced. Coupled to the network 502, there are a server 504 and a plurality of local machines or boxes 506-1, 506-2, 506-3, . . . 506-n and 508. The server 504 may correspond to the server 502 of FIG. 2. Each of the boxes 506-1, 506-2, 506-3, . . . 506-n and 508 includes or is connected to a display screen (not shown). In one embodiment, each of the boxes 506-1, 506-2, 506-3, . . . 506-n and 508 may correspond to a computing device, a set-top box, or a television. Each of the boxes 506-1, 506-2, 506-3, . . . 506-n and 508 may access compressed data representing one or more movies that may be locally or remotely provided.

According to one embodiment, any of the boxes 506-1, 506-2, 506-3, . . . 506-n and 508 may receive compressed data from the server 504 that centrally stores all video data and delivers required video data pertaining to an ordered title upon receiving a request. According to another embodiment, the server 504 is configured to identify one or more other boxes to supply pieces of compressed data to a box requesting the data. In other words, all video data is distributed among all boxes in service and the server 504 is not required to deliver all the data in response to a request, and instead is configured to provide source information as to where and how to retrieve some or all of the data from other boxes. As shown in FIG. 5A, a set of compressed video 510 for a movie includes four segments, one being locally available, and the other three segments are respectively fetched from the boxes 506-1, 506-3 and 506-n.

Figure 7A:
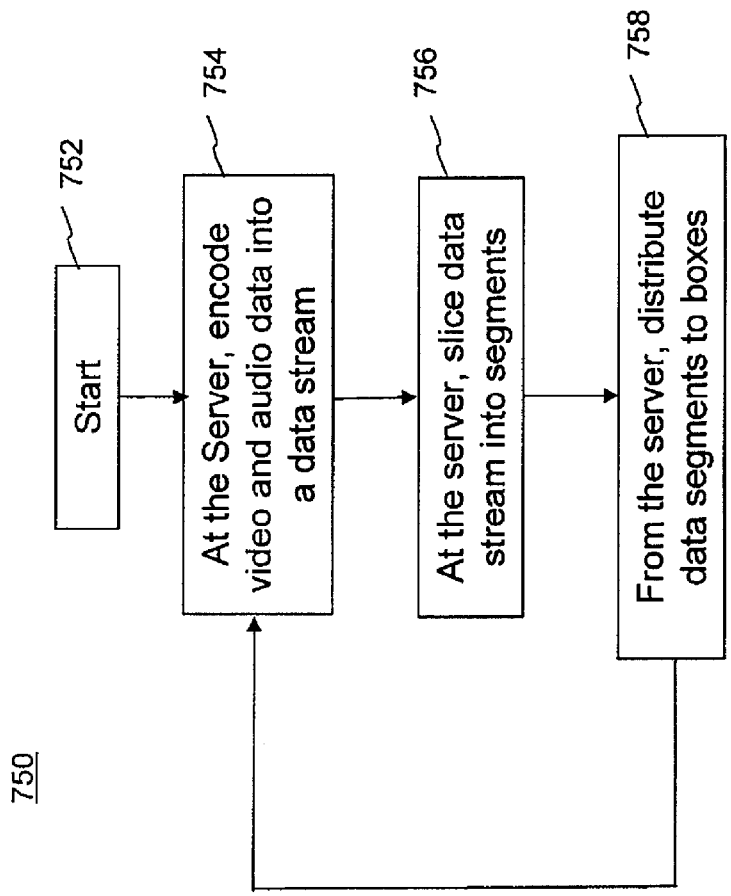
FIGS. 7A and 7B show flowcharts or processes according to an embodiment of the present invention.

The operation of distributing segments of a single video and multiple audios—fat seeding—is described in a flow chart or process 750 shown in FIG. 7A. The process 750 may be readily understood in conjunction with FIGS. 2A, 4A, and 6. However, the process 750 may be independently implemented in software, hardware or a combination of both as a method, a process, or a system. Preferably, the process 750 is executed in a computing device that may correspond to a box as used herein.

At 752, the server is configured to distribute programs to a plurality of boxes for future access depending on popularity. The server also takes into account the programs that are already residing at boxes because either they have been viewed or distributed. Once the server determines that a program needs to be distributed, at 754, the server encodes the program. Typically, the program includes a single video and multiple audios. However, the data stream may included multiple video, audio, and closed captioning. The server may encode the single video and multiple audios as a single data stream or as separate data streams. For example, referring back to FIG. 3A, a data stream 240-2 includes a single video with multiple audios. The data streams 240-4 and 240-6 include video and audio streams separately.

In the case of one data stream that includes a video and multiple audios, at 756, the data stream is sliced into segments and distributed to a number of boxes at 758. The number and location of boxes depend on the popularity of a program, available bandwidth, and other factors.

In the case of separate data stream for a video and each audio, at 756, each data stream is sliced into segments and distributed to a number of boxes at 758. This is repeated until all audios have been distributed to the boxes. Whether the data stream includes single video and multiple audios, or single video or audio, once the process is completed, the selected boxes have for each video, multiple audios associated with each video—fat seed. Typically, data stream is sent from a server to some clients, and then from those clients to other clients.

Figure 7B:
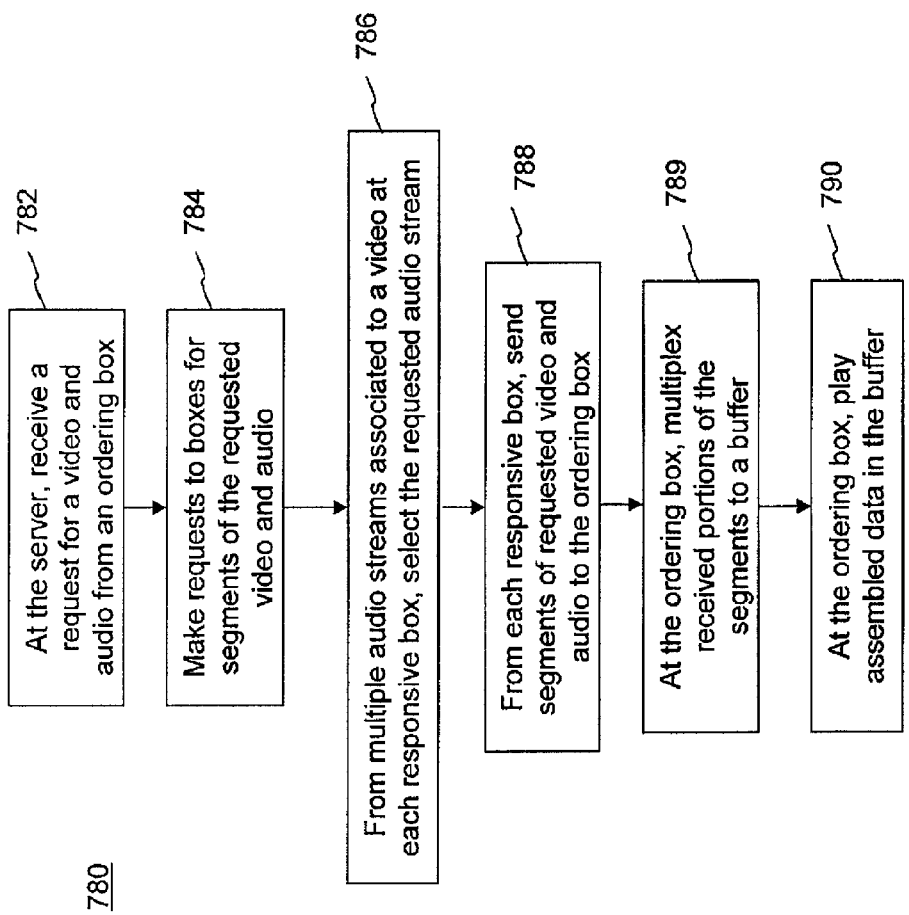

The operation of fetching segments of requested single video and single audio—lean streaming is described in a flow chart or process 780 shown in FIG. 7B. At 782, the server waits for a request from one of the boxes (hereinafter "ordering box") for a title. Once a request is received, the server determines which boxes have segments of requested program and instructs the boxes to forward the segments of the requested program. In FIG. 7B, the buffer can be on a disk and/or in the memory.

At 786, depending on how the audio streams are residing at the box—either as separate streams or in a single data stream along with the video—the requested audio is selected. In the case where multiple audios are in separate audio streams, the requested audio is identified by its audio ID number. Then, the selected audio is multiplex with the requested video. In the case where multiple audios are in a single data stream together, all audios are filtered out except for the requested audio. Thus, after the filtering, the data stream only includes the requested video and audio. In either case, a lean stream including one video and one audio is constructed. MPEG2 TS has about 188 byte packets, and individual stream IDs, knows as Program Ids (PID). Video, and each audio stream have their own PID.

At 788, segments of the lean stream of the requested video and audio are sent to the ordering box. At 789, the ordering box receives, multiplexes segments received from different boxes to a buffer. At 790, the ordering box plays assembled data in the buffer.

As described above, the architecture of FIG. 2 provides techniques to seed segments of a video with multiple audios associated with the video to a number of boxes coupled to the network. Once an ordering makes a request for a video and an audio, responsive boxes filters to provide a lean stream of the requested video and audio to the ordering box. These techniques allow faster and cheaper ways to access different programs with multiple audios without expanding bandwidth requirements.

Similarly, in the event where a video is associated with multiple subtitle tracks, responsive boxes can filter out the irrelevant subtitles before streaming. If the user does not choose any subtitles, then all subtitle packets are filtered out. In cases where there are multiple video tracks, e.g., at different bit rates, and one video track may be streamed depending on the bandwidth available on the receiver.

In addition, one embodiment of the present invention dynamically determines what fragments to stream and what to filter out. For example, the receiver may tell the sender exactly what to send and what to filter out. Such dynamic switching is useful to enable the following features:

Dynamic switching of audio tracks during a movie.
Dynamic switching of subtitles during a movie.
Dynamic switching of video tracks (or audio tracks) to adapt to bandwidth changes. If there are video/audio encoded at different bitrates, it can be switched to a lower-quality track whenever bandwidth drops and switch to a higher-quality track whenever bandwidth increases. For example, the sender sends as fast as possible, potentially capped by a designated maximum rate, and the receiver monitors how long his buffer of received data is to determine what quality level the content should be streamed at. If the buffer starts decreasing below a threshold, he reduces the quality level. If the buffer starts increasing above a threshold, he increases the quality level.

In another embodiment, the above described architecture can be use to deal with associated closed caption streams. Each closed caption stream of data is multiplexed into the media stream with its own ID and its own presentation time information. There can be none, one or more closed caption streams in the media stream. Each closed caption stream could correspond to one language or there could be multiple closed caption streams in single language with different content (e.g. Actual dialog, or commentary, etc). Segments of the complete media stream with multiple close caption streams gets distributed to client boxes during seeding (fat seed). During playback, user of the requesting box selects which closed caption stream, if any, s/he wants to see. The serving boxes filter out all closed caption streams other than the requested stream based on the ID of the requested stream.

The foregoing description of embodiments is illustrative of various aspects/embodiments of the present invention. Various modifications to the present invention can be made to the preferred embodiments by those skilled in the art without departing from the true spirit and scope of the invention as defined by the appended claims. Accordingly, the scope of the present invention is defined by the appended claims rather than the foregoing description of embodiments.

What is claimed is:

1. A method for receiving media programs over a content delivery network, the method being performed by a user device and comprising:

transmitting a request for a media program to a server over the content delivery network; and receiving data corresponding to the media program over the content delivery network, wherein the data is encoded at different bitrates such that data encoded at a lower bitrate is of a lower quality than data encoded at a higher bitrate;

wherein receiving data corresponding to the media program comprises (i) monitoring a bandwidth of the user device in order to make a determination that there is a change in the bandwidth during data retrieval, (ii) retrieving data encoded at a lower bitrate when the bandwidth decreases below a threshold during data retrieval, and (iii) retrieving data encoded at a higher bitrate when the bandwidth increases above the threshold during data retrieval; and wherein the data corresponding to the program file is divided into a plurality of data segments, the plurality of data segments being stored in a plurality of devices in the content delivery network, each data segment comprising non-sequential interleaved data blocks comprising the media program, each data block including a block of video and a plurality of segments of audio encoding a block of audio corresponding to the block of video encoded at different bit rates, wherein a number of segments of the plurality of data segments is equal to the smallest integer larger than a required transmission rate divided by a minimum uploading speed for the content delivery network.

2. The method of claim 1, wherein the server provides source information for identifying one or more devices from the plurality of devices that is to provide the plurality of data segments.

3. The method of claim 2, wherein receiving data corresponding to the media program includes receiving the plurality of data segments from the one or more devices.

4. The method of claim 1, wherein a size of the data segments is based on at least a minimum uploading speed of the content delivery network or a minimum downloading speed of the content delivery network.

5. The method of claim 3, further comprising combining the plurality of data segments for play back of the media program.

6. The method of claim 1, wherein receiving data corresponding to the media program includes receiving the data from the server.

7. The method of claim 1, further comprising playing back the media program using the data corresponding to the media program.

8. The method of claim 1, wherein the server authorized the user device before enabling the user device to receive data corresponding to the media program.

9. A system for providing media programs over a content delivery network, the system comprising:
a server; and
a plurality of devices coupled to the network, wherein a first device of the plurality of devices is configured to:
transmit a request to the server for a media program; and
receive data corresponding to the media program, wherein the data is encoded at different bitrates such that data encoded at a lower bitrate is of a lower quality than data encoded at a higher bitrate;
wherein the first device is configured to receive data corresponding to the media program by (i) monitoring a bandwidth of the first device in order to make a determination that there is a change in the bandwidth during data retrieval, (ii) retrieving data encoded at a lower bitrate when the bandwidth decreases below a threshold during data retrieval, and (iii) retrieving data encoded at a higher bitrate when the bandwidth increases above the threshold during data retrieval;
wherein the media program is divided into a plurality of data segments, the plurality of data segments being stored in a plurality of devices in the content delivery network, each data segment comprising non-sequential interleaved data blocks comprising the media program, each data block including a block of video and a plurality of segments of audio encoding a block of audio corresponding to the block of video encoded at different bit rates; and wherein the first device is configured to receive data corresponding to the media program by receiving the plurality of data segments from the plurality of devices;

wherein the data is divided into a plurality of data segments based on at least a minimum uploading speed of the content delivery network or a minimum downloading speed of the content delivery network, wherein a number of segments of the plurality of data segments is equal to the smallest integer larger than a required transmission rate divided by the minimum uploading speed of the content delivery network.

10. The system of claim 9, wherein the server is configured to provide source information for identifying one or more devices from the plurality of devices that is to provide the plurality of data segments to the first device.

11. The system of claim 9, wherein the first device is further configured to multiplex the plurality of data segments as the plurality of data segments are received for play back of the media program.

12. The system of claim 9, wherein the first device is configured to receive data corresponding to the media program by receiving the data from the server.

13. The system of claim 9, wherein the first device is further configured to play back the media program using the data corresponding to the media program.

14. The system of claim 9, wherein the server is configured to authorize the first device before enabling the first device to receive data corresponding to the media program.

15. A method for receiving media programs over a content delivery network, the method being performed by a user device and comprising:
transmitting a request for a media program to a server over the content delivery network; and
receiving data corresponding to the media program over the content delivery network, wherein the data is encoded at different bitrates such that data encoded at a lower bitrate is of a lower quality than data encoded at a higher bitrate;
wherein receiving data corresponding to the media program comprises (i) monitoring a bandwidth of the user device in order to make a determination that there is a change in the bandwidth during data retrieval, (ii) retrieving data encoded at a lower bitrate when the bandwidth decreases below a threshold during data retrieval, and (iii) retrieving data encoded at a higher bitrate when the bandwidth increases above the threshold during data retrieval;
wherein the data corresponding to the program file is divided into a plurality of data segments, the plurality of data segments being stored in a plurality of devices in the content delivery network, each data segment comprising non-sequential interleaved data blocks comprising the media program, each data block including a block of video and a plurality of segments of audio encoding a block of audio corresponding to the block of video encoded at different bit rates; and
wherein a number of segments of the plurality of data segments is equal to the smallest integer larger than a required transmission rate divided by a minimum uploading speed for the content delivery network.

16. The method of claim 1, wherein the data corresponding to the program file is divided into a plurality of data segments by decimated sampling.

17. The method of claim 1, wherein the data corresponding to the program file is divided into a plurality of data segments by decimated sampling such that each data segment includes every Nth data block from a starting block, each data segment of the plurality of data segments starting at a different starting block.

\* \* \* \* \*